(12) United States Patent
Okada et al.

(10) Patent No.: US 11,878,554 B2
(45) Date of Patent: Jan. 23, 2024

(54) TYRE

(71) Applicant: Sumitomo Rubber Industries, Ltd., Kobe (JP)

(72) Inventors: Takashi Okada, Kobe (JP); Saori Yoshida, Kobe (JP); Shunta Kokatsu, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 434 days.

(21) Appl. No.: 17/131,177

(22) Filed: Dec. 22, 2020

(65) Prior Publication Data

US 2021/0197622 A1    Jul. 1, 2021

(30) Foreign Application Priority Data

Dec. 27, 2019    (JP) .................................. 2019-238294
Dec. 27, 2019    (JP) .................................. 2019-238295

(51) Int. Cl.
  *B60C 11/12*    (2006.01)
  *B60C 11/03*    (2006.01)

(52) U.S. Cl.
  CPC ...... *B60C 11/1204* (2013.01); *B60C 11/0304* (2013.01); *B60C 11/1236* (2013.01);
  (Continued)

(58) Field of Classification Search
  CPC ............ B60C 11/0304; B60C 11/1281; B60C 11/1263; B60C 11/1236; B60C 2011/1227; B60C 2011/1295
  See application file for complete search history.

(56) References Cited

U.S. PATENT DOCUMENTS

2013/0167997 A1   7/2013   Hayashi
2016/0193880 A1*  7/2016   Colombo ............ B60C 11/0306
                                          152/209.8
(Continued)

FOREIGN PATENT DOCUMENTS

DE      102012108847 A1  *  3/2014
DE    11 2017 007 104 T5    11/2019
(Continued)

OTHER PUBLICATIONS

Machine translation for Japan 2017-144761 (Year: 2023).*
(Continued)

*Primary Examiner* — Steven D Maki
(74) *Attorney, Agent, or Firm* — Birch, Stewart, Kolasch & Birch, LLP

(57) ABSTRACT

A tyre includes a crown land portion, an outboard middle land portion, an outboard shoulder land portion, an outboard crown circumferential groove, an outboard shoulder circumferential groove, an inboard middle land portion, an inboard shoulder land portion, an inboard crown circumferential groove, and an inboard shoulder circumferential groove. The outboard middle land portion is provided with full-opened outboard middle sipe that are inclined to a tyre axial direction. The outboard middle sipes each have two opposite sipe-edge portions provided with chamfer portions. In each chamfer portion of each outboard middle sipe, chamfer widths at both ends of the outboard middle sipe are larger than a chamfer width of a central portion of the outboard middle sipe. The outboard shoulder land portion is provided with outboard shoulder sipes that are inclined in the same direction as the outboard middle sipes to the tyre axial direction.

19 Claims, 11 Drawing Sheets

(52) U.S. Cl.
CPC ...... *B60C 11/1263* (2013.01); *B60C 11/1272* (2013.01); *B60C 11/1281* (2013.01); *B60C 2011/0341* (2013.01); *B60C 2011/1227* (2013.01); *B60C 2011/1268* (2013.01); *B60C 2011/1295* (2013.01)

(56) References Cited

U.S. PATENT DOCUMENTS

| | | | |
|---|---|---|---|
| 2017/0210177 A1* | 7/2017 | Osawa | B60C 11/0306 |
| 2018/0015788 A1* | 1/2018 | Hayashi | B60C 11/12 |
| 2018/0086149 A1* | 3/2018 | Hoshino | B60C 11/0304 |
| 2018/0215204 A1 | 8/2018 | Kuriyama | |
| 2019/0389255 A1 | 12/2019 | Kubota et al. | |
| 2021/0107318 A1* | 4/2021 | Speziari | B60C 11/033 |

FOREIGN PATENT DOCUMENTS

| | | |
|---|---|---|
| EP | 3 056 359 A1 | 8/2016 |
| EP | 3 093 162 A1 | 11/2016 |
| EP | 3 219 511 A1 | 9/2017 |
| EP | 3 260 308 A1 | 12/2017 |
| EP | 3 260 309 A1 | 12/2017 |
| EP | 3 308 980 A1 | 4/2018 |
| EP | 3 575 110 A1 | 12/2019 |
| EP | 3 693 187 A1 | 8/2020 |
| ER | 3 260 309 A1 | 12/2017 |
| JP | 2012-020620 A * | 2/2012 |
| JP | 2013-139193 A | 7/2013 |
| JP | 2015-231812 A | 12/2015 |
| JP | 2017-144761 A * | 8/2017 |

OTHER PUBLICATIONS

Machine translation for Japan 2012-020620 (Year: 2023).*
Machine translation for German 102012108847 (Year: 2023).*
Extended European Search Report for European Application No. 20208798.7, dated Apr. 22, 2021.
Extended European Search Report for European Application No. 20215961.2, dated Apr. 14, 2021.

* cited by examiner

TYRE

This application claims the benefit of foreign priority to Japanese Patent Applications No. JP2019-238294 and No. JP2019-238295, filed Dec. 27, 2019, which are incorporated by reference in its entirety.

BACKGROUND ART

Field of the Disclosure

The present disclosure relates to a tyre, and more specifically relates to a pneumatic tyre for automobile.

Description of the Related Art

Tyres are required to have a good ride comfort. In particular, pneumatic tyres for luxury cars have such needs.

Conventionally, in order to improve ride comfort of tyres, attempts have been made to reduce tread circumferential rigidity by providing lateral grooves, lug grooves, etc., which have relatively large widths and depths. The following patent documents 1 and 2 may disclose such a tyre.

PATENT DOCUMENT

[Patent Document 1]
Japanese Unexamined Patent Application Publication 2013-139193
[Patent Document 2]
Japanese Unexamined Patent Application Publication 2015-231812

SUMMARY OF THE DISCLOSURE

In general, tyres with many lateral grooves or lug grooves in the tread portion tend to have worse wear resistance.

The present disclosure has been made in view of the above circumstances and has a main object to provide a tyre capable of improving ride comfort and wear resistance.

In one aspect of the disclosure, a tyre includes a tread portion having a designated mounting direction to a vehicle, the tread portion being provided with a crown land portion, an outboard middle land portion and an outboard shoulder land portion which are located outboard of a vehicle when the tyre is mounted to the vehicle, an outboard crown circumferential groove extending between the crown land portion and the outboard middle land portion, an outboard shoulder circumferential groove extending between the outboard middle land portion and the outboard shoulder land portion, an inboard middle land portion and an inboard shoulder land portion which are located inboard of the vehicle when the tyre is mounted to the vehicle, an inboard crown circumferential groove extending between the crown land portion and the inboard middle land portion, and an inboard shoulder circumferential groove extending between the inboard middle land portion and the inboard shoulder land portion, wherein the outboard middle land portion is provided with two or more full-opened outboard middle sipes, the outboard middle sipes are inclined with respect to a tyre axial direction, the outboard middle sipes each have two opposite sipe-edge portions provided with chamfer portions, in each chamfer portion of each outboard middle sipe, chamfer widths at both ends in a sipe longitudinal direction of the outboard middle sipe are larger than a chamfer width of a central portion in the sipe longitudinal direction of the outboard middle sipe, the outboard shoulder land portion is provided with two or more outboard shoulder sipes, the outboard shoulder sipes are inclined in a same direction as the outboard middle sipes with respect to the tyre axial direction, the crown land portion is provided with two or more semi-opened crown sipes, the crown sipes each have two opposite sipe-edge portions provided with chamfer portions, the inboard middle land portion is provided with two or more semi-opened first inboard middle sipes communicated with the inboard crown circumferential groove, and two or more semi-opened second inboard middle sipes communicated with the inboard shoulder circumferential groove, the first inboard middle sipes each have two opposite sipe-edge portions provided with chamfer portions, and the second inboard middle sipes each have two opposite sipe-edge portions where no chamfer portion is provided.

In another aspect of the disclosure, each chamfer portion of each outboard middle sipe increases in chamfer width from the central portion to the both ends continuously, and in each outboard middle sipe, chamfer depths at the both ends of the outboard middle sipe are greater than a chamfer depth of the central portion of the outboard middle sipe, and a depth of the outboard middle sipe at an innermost end thereof in the tyre axial direction is greater than a depth of the outboard middle sipe at an outermost end thereof in the tyre axial direction.

In another aspect of the disclosure, in each outboard middle sipe, the depth of the outboard middle sipe at the innermost end may be in a range from 65% to 85% a maximum depth of the outboard crown circumferential groove, and the depth of the middle sipe at the outermost end may be in a range from 45% to 65% the maximum depth of the outboard crown circumferential groove.

In another aspect of the disclosure, the outboard shoulder sipes may include one or more full-opened first outboard shoulder sipes each of which is arranged so as to be contiguous to a respective one of the outboard middle sipes smoothly via the shoulder circumferential groove, and/or one or more semi-opened second outboard shoulder sipes each of which is arranged so as not to be contiguous to the outboard middle sipes smoothly via the shoulder circumferential groove.

In another aspect of the disclosure, the first inboard middle sipes may be arranged so as not to overlap the crown sipes in the tyre circumferential direction, and the second inboard middle sipes may be arranged so as to overlap the crown sipes in the tyre circumferential direction.

In another aspect of the disclosure, the first inboard middle sipes and the second inboard middle sipes may be inclined with respect to the tyre axial direction, and the crown sipes, with respect to the tyre axial direction, may be inclined in an opposite direction to the first inboard middle sipes and the second inboard middle sipes.

In another aspect of the disclosure, in each chamfer portion of each crown sipe, a chamfer width may increase toward the inboard crown circumferential groove, and in each chamfer portion of each first inboard middle sipe, a chamfer width may increase toward the inboard crown circumferential groove.

In another aspect of the disclosure, the inboard shoulder land portion may be provided with two or more full-opened inboard shoulder sipes, and some of the inboard shoulder sipes may be arranged so as to be contiguous to the second inboard middle sipes smoothly via the inboard shoulder circumferential groove.

In another aspect of the disclosure, the inboard shoulder sipes each may have two opposite sipe-edge portions where no chamfer portion is provided.

In another aspect of the disclosure, a total number of the inboard shoulder sipes may be greater than a total number of the second inboard middle sipes.

In another aspect of the disclosure, the inboard shoulder land portion may have no grooves other than sipes.

In another aspect of the disclosure, a tyre includes a tread portion being provided with a middle land portion, a shoulder land portion, and a shoulder circumferential groove extending between the middle land portion and the shoulder land portion, wherein the middle land portion is provided with two or more full-opened middle sipes, the middle sipes are inclined with respect to a tyre axial direction, the middle sipes each have two opposite sipe-edge portions provided with chamfer portions, in each chamfer portion of each middle sipe, chamfer widths at both ends in a sipe longitudinal direction of the middle sipe are larger than a chamfer width of a central portion in the sipe longitudinal direction of the middle sipe, each chamfer portion of each middle sipe increases in chamfer width from the central portion to the both ends continuously, in each middle sipe, chamfer depths at the both ends of the middle sipe are greater than a chamfer depth of the central portion of the middle sipe, and a depth of the middle sipe at an innermost end thereof in the tyre axial direction is greater than a depth of the middle sipe at an outermost end thereof in the tyre axial direction, and the shoulder land portion is provided with two or more shoulder sipes that are inclined in a same direction as the middle sipes with respect to the tyre axial direction.

In another aspect of the disclosure, a crown circumferential groove may be arranged adjacently inwardly of the middle land portion in the tyre axial direction, and in each middle sipe, the depth of the middle sipe at the innermost end may be in a range from 65% to 85% a maximum depth of the crown circumferential groove, and the depth of the middle sipe at the outermost end may be in a range from 45% to 65% the maximum depth of the crown circumferential groove.

In another aspect of the disclosure, a tyre includes a tread portion being provided with a crown land portion, a middle land portion, a shoulder land portion, a crown circumferential groove extending between the crown land portion and the middle land portion, and a shoulder circumferential groove extending between the middle land portion and the shoulder land portion, wherein the crown land portion is provided with two or more semi-opened crown sipes, the crown sipes each have two opposite sipe-edge portions provided with chamfer portions, the middle land portion is provided with two or more semi-opened first middle sipes communicated with the crown circumferential groove, and two or more semi-opened second middle sipes communicated with the shoulder circumferential groove, and the first middle sipes each have two opposite sipe-edge portions provided with chamfer portions, the first middle sipes are arranged so as not to overlap the crown sipes in a tyre circumferential direction, the second middle sipes each have two opposite sipe-edge portions where no chamfer portion is provided, and the second middle sipes are arranged so as to overlap the crown sipes in the tyre circumferential direction.

DESCRIPTION OF THE PREFERRED EMBODIMENTS

An embodiment of the present disclosure will be explained below with reference to the accompanying drawings. Note that the following preferred embodiments and the specific configurations shown on the figures are for understanding the contents of the present disclosure, and the present disclosure is not limited to the specific configurations as shown.

Figure 1:
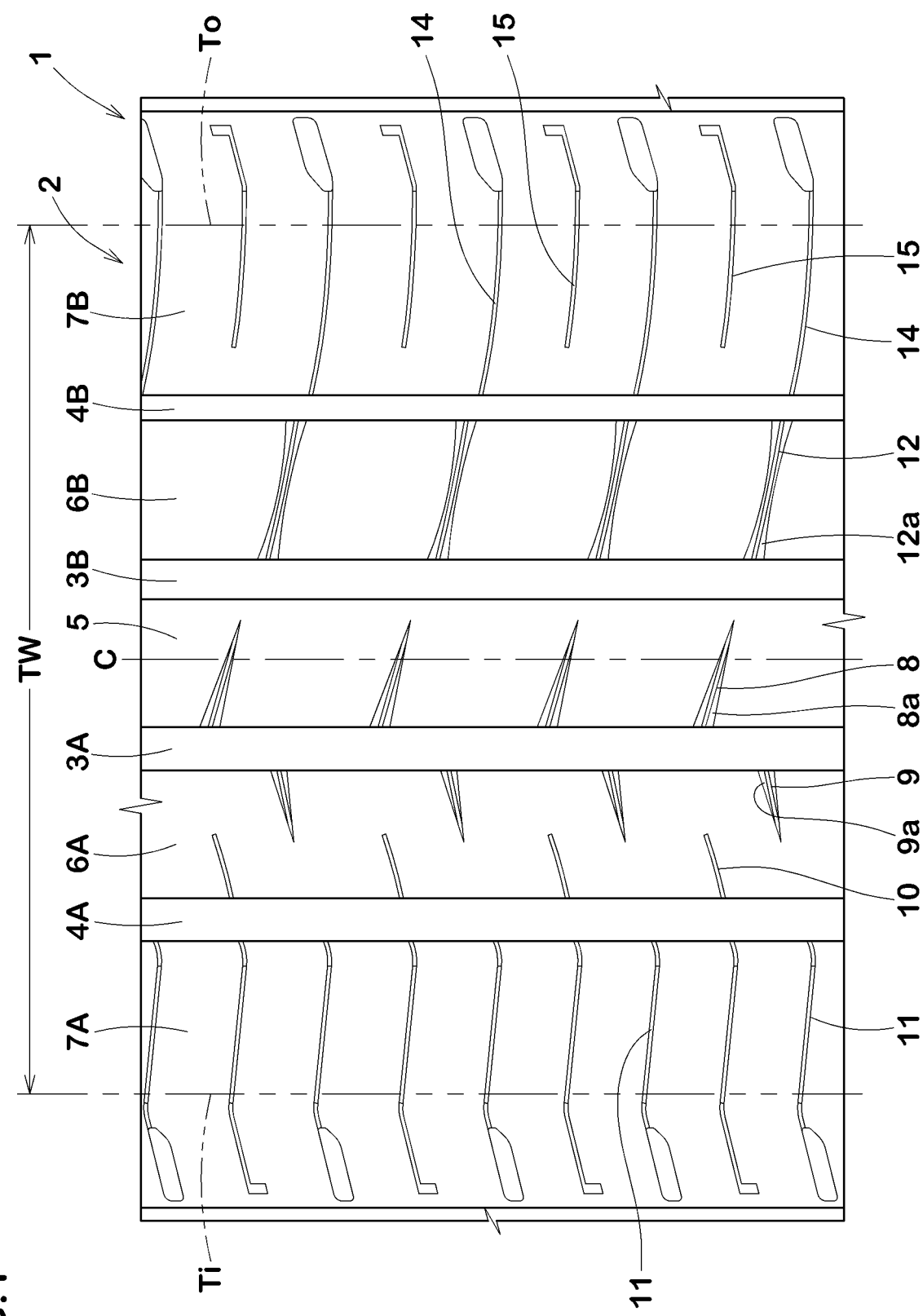
FIG. 1 is a development view of a tread portion of a tyre according to an embodiment of the disclosure.

FIG. 1 illustrates a development view of a tread portion 2 of a tyre 1 according to an embodiment of the disclosure. In the present embodiment, as the tyre 1, a pneumatic tyre for passenger car, more preferably a pneumatic radial tyre, is illustrated.

As a preferred embodiment, the tyre 1 of the present embodiment has a designated mounting direction to a vehicle in order to more effectively exhibit driving performance of the tread portion 2. Thus, the tread portion 2 includes an inboard tread edge Ti and an outboard tread edge To that are intended to be located on inboard and outboard of a vehicle, respectively, when the tyre is mounted to the vehicle. Note that the mounting direction may be indicated on sidewall portions (not illustrated) of the tyre 1, for example.

As used herein, the inboard tread edge Ti and the outboard tread edge To are the axial outermost inboard and outboard edges of the ground contacting patch of the tread portion of the tyre 1 which occurs under a normal loaded condition.

As used herein, the "normal loaded condition" is such that the tyre 1 is mounted onto a standard wheel rim (not illustrated) with a standard pressure and grounded on a plane with a standard tyre load with zero camber angles.

As used herein, a "normal inflated condition" is such that the tyre 1 is mounted onto the standard wheel rim (not illustrated) with the standard pressure with no tyre load. Unless otherwise noted, it is noted that dimensions of portions of the tyre 1 are values measured under the normal inflated condition.

As used herein, the "standard wheel rim" is a wheel rim officially approved for each tyre by standards organizations on which the tyre is based, wherein the standard wheel rim is the "standard rim" specified in JATMA, the "Design Rim" in TRA, and the "Measuring Rim" in ETRTO, for example.

As used herein, the "standard pressure" is a standard pressure officially approved for each tyre by standards organizations on which the tyre is based, wherein the standard pressure is the "maximum air pressure" in JATMA, the maximum pressure given in the "Tire Load Limits at Various Cold Inflation Pressures" table in TRA, and the "Inflation Pressure" in ETRTO, for example.

As used herein, the "standard tyre load" is a tyre load officially approved for each tyre by standards organizations in which the tyre is based, wherein the standard tyre load is the "maximum load capacity" in JATMA, the maximum value given in the above-mentioned table in TRA, and the "Load Capacity" in ETRTO, for example.

As illustrated in FIG. 1, the tread portion 2 of the tyre 1 includes a plurality of circumferential grooves and a plurality of land portions.

[Circumferential Grooves]

The circumferential grooves have a sufficiently large groove width such that a pair of groove walls do not come into contact with each other on the ground plane under the normal loaded condition. As such, a groove width of the circumferential grooves, for example, may be equal to or more than 2.5 mm, preferably equal to or more than 3.0 mm, more preferably equal to or more than 3.5 mm. Similarly, the maximum depth of the circumferential grooves, for example, may be equal to or more than 5.0 mm, preferably equal to or more than 6.0 mm. Such circumferential grooves can provide basic drainage performance of the tyre 1.

In the present embodiment, the circumferential grooves consist of four grooves that include an inboard crown circumferential groove 3A, an inboard shoulder circumferential groove 4A, an outboard crown circumferential groove 3B and the outboard shoulder circumferential groove 4B. These circumferential grooves 3A, 4A, 3B and 4B, for example, extend along the tyre circumferential direction in a straight manner. Specifically, these circumferential grooves 3A, 4A, 3B and 4B, on a ground contact surface of the tread portion 2, each have a pair of groove edges that extends straight in parallel with the tyre circumferential direction. In another aspect, one or more circumferential grooves 3A, 4A, 3B and 4B may extend in a wavy or zigzag manner.

The inboard crown circumferential groove 3A is arranged between the tyre equator C and the inboard tread edge Ti. The inboard shoulder circumferential groove 4A is arranged between the inboard crown circumferential groove 3A and the inboard tread edge Ti. The outboard crown circumferential groove 3B is arranged between the tyre equator C and the outboard tread edge To. The outboard shoulder circumferential groove 4B is arranged between the outboard crown circumferential groove 3B and the outboard tread edge To.

[Land Portions]

In the present embodiment, the tread portion 2 is formed into five land portions by the above circumferential grooves 3A, 4A, 3B and 4B. The land portions consist of a crown land portion 5, an inboard middle land portion 6A, an inboard shoulder land portion 7A, an outboard middle land portion 6B, and an outboard shoulder land portion 7B. Widths in the tyre axial direction of the land portions, for example, are preferably equal to or more than 10% a tread contact width TW. As used herein, the tread contact width TW is an axial distance between the inboard tread edge Ti and the outboard tread edge To.

The crown land portion 5 is defined between the inboard crown circumferential groove 3A and the outboard crown circumferential groove 3B. The inboard middle land portion 6A is adjacent to the crown land portion 5 on the inboard tread edge Ti side, and is defined between the inboard crown circumferential groove 3A and the inboard shoulder circumferential groove 4A. The inboard shoulder land portion 7A is adjacent to the inboard middle land portion 6A on the inboard tread edge Ti side, and is defined between the inboard shoulder circumferential groove 4A and the inboard tread edge Ti. The outboard middle land portion 6B is adjacent to the crown land portion 5 on the outboard tread edge To side, and is defined between the outboard crown circumferential groove 3B and the outboard shoulder circumferential groove 4B. The outboard shoulder land portion 7B is adjacent to the outboard middle land portion 6B on the outboard tread edge To side, and is defined between the outboard shoulder circumferential groove 4B and the outboard tread edge To.

[Major Structure]

Figure 2:
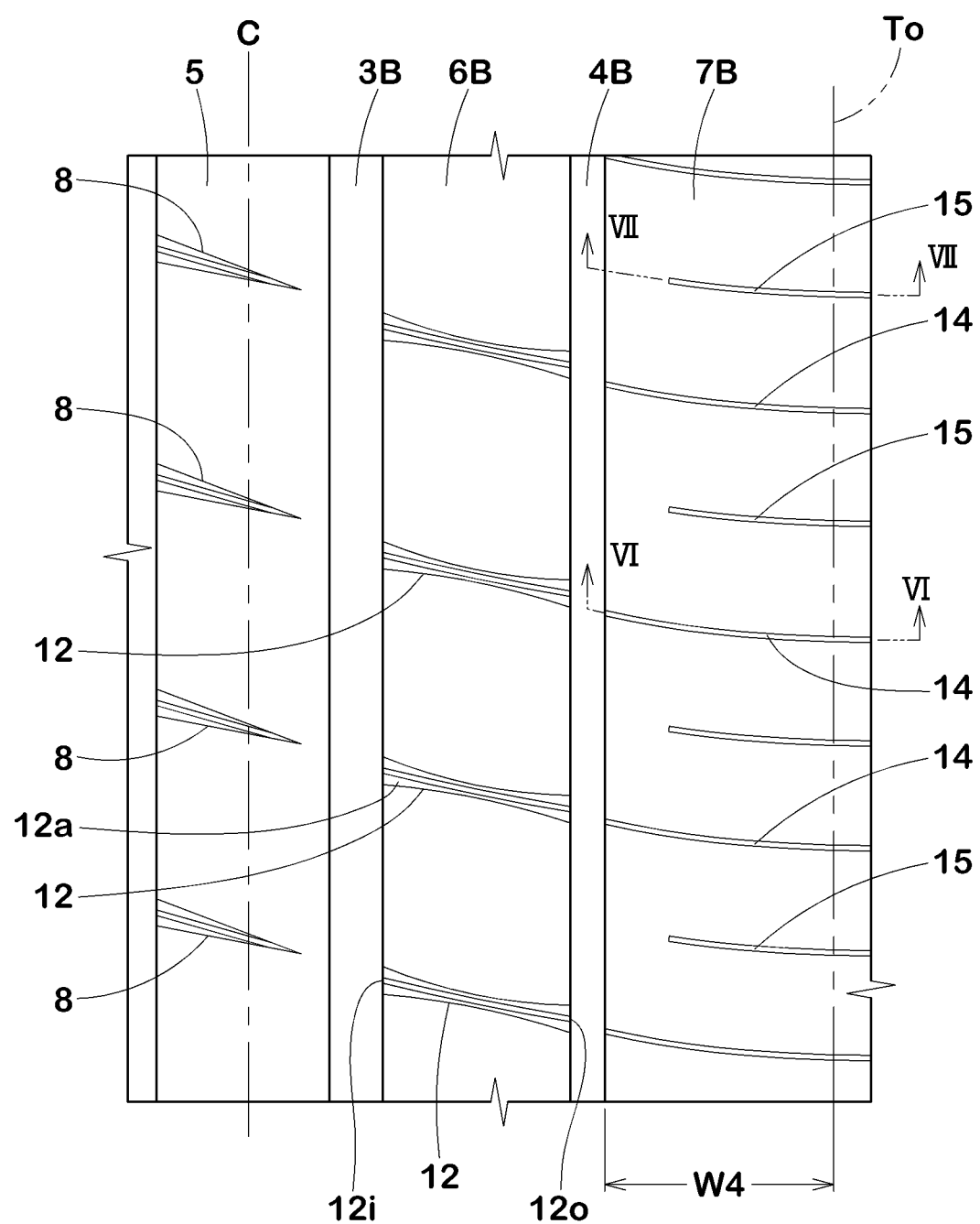
FIG. 2 is a partial enlarged view of FIG. 1 on an outboard tread edge side.

FIG. 2 illustrates a partial enlarged view of FIG. 1 on the outboard tread edge To side. As illustrated in FIG. 1 and FIG. 2, in the present embodiment, the outboard middle land portion 6B is provided with two or more full-opened middle sipes 12 (hereinafter, referred to as "outboard middle sipes 12"). The outboard middle sipes 12 are inclined with respect to the tyre axial direction. Further, the outboard middle sipes 12 each have two opposite sipe-edge portions provided with chamfer portions 12a. Furthermore, in each chamfer portion 12a of each outboard middle sipe 12, chamfer widths at both ends (an innermost end 12i and an outermost end 12o) in the sipe longitudinal direction of the outboard middle sipe 12 are larger than a chamfer width of a central portion in the sipe longitudinal direction of the outboard middle sipe 12. Furthermore, in the present embodiment, the outboard shoulder land portion 7B is provided with a plurality of shoulder sipes 14 and 15 (hereinafter, referred to as "first outboard shoulder sipes 14" and "second outboard shoulder sipes 15", respectively). These sipes 14 and 15, with respect to the tyre axial direction, are inclined in the same direction as the outboard middle sipes 12.

As used herein, "sipe" means a narrow cut formed with a small width so that at least a part of a pair of sipe walls comes into contact with each other in a ground contact region under the normal loaded condition. For example, the sipe has a width equal to or less than 1.5 mm, preferably equal to or less than 1.0 mm. As used herein, "full-opened" sipe means a sipe whose both ends in the sipe longitudinal direction are open to both side edges of a land portions (usually one or two circumferential groove and/or one tread edge). Further, as used herein, "semi-open" sipe means a sipe that has one end in the sipe longitudinal direction opening to an end of a land portion (usually a circumferential groove or tread end) and that has the other end terminating within the land portion without communicating with other grooves.

These sipes 12, 14 and 15 deform so that they close when grounding. Thus, each sipe 12, 14 and 15 is less deformed during driving than lateral grooves and lug grooves that do not close when grounding. Therefore, the tyre 1 of the present embodiment can provide excellent wear resistance.

On the other hand, if circumferential rigidity of the outboard middle land portion 6B is too high, improvement in ride comfort may not be expected. In the present embodiment, the sipe-edge portions on both sides of the outboard middle sipes 12 are formed by chamfer portions. In addition, in each chamfer portion of each outboard middle sipe 12, chamfer widths at the both ends of the outboard middle sipe are larger than a chamfer width of the central portion of the outboard middle sipe 12. As a result, rigidity of axially both ends of the outboard middle land portion 6B can be reduced while ensuring rigidity of a central portion of the outboard middle land portion 6B in the width direction, resulting in improving both wear resistance and ride comfort.

Further, since the first outboard shoulder sipes 14 and the second outboard shoulder sipes 15 are inclined in the same direction as the outboard middle sipes 12 with respect to the tyre axial direction, ground contact behavior of the outboard middle land portion 6B and the outboard shoulder land portion 7B can be stable so that ride comfort and wear resistance of the tyre can further be improved.

As described above, the tyre 1 according to the present embodiment can improve ride comfort and wear resistance by mainly improving a pattern portion on the outboard tread edge To side. Hereinafter, in the present embodiment, the case where the middle land portion and the shoulder land portion according to the present invention are the outboard middle land portion 6B and the outboard shoulder land portion 7B on the outboard tread edge To side, respectively, will be described as a preferred embodiment.

[Outboard Middle Land Portion]

As illustrated in FIG. 2, the outboard middle land portion 6B is provided with two or more full-opened outboard middle sipes 12. The outboard middle sipes 12 has less deformation when grounding than lateral grooves and lug grooves, improving wear resistance of the outboard middle land portion 6B. Further, the outboard middle sipes 12 can promote deformation of the outboard middle land portion 6B appropriately to enhance impact mitigation capacity of the outboard middle land portion 6B, improving ride comfort.

The outboard middle land portion 6B according to the present embodiment has no lateral grooves nor circumferential grooves other than sipes. Although the outboard middle land portion 6B tends to receive large ground contact pressure and shearing force when driving, the outboard middle land portion 6B with high shearing and bending rigidity can exhibit excellent wear resistance.

In the present embodiment, the outboard middle sipes 12 are inclined with respect to the tyre axial direction. In some preferred embodiments, the outboard middle sipes 12 except the chamfer portions extend in a single circular arc or straight manner from the innermost ends 12$i$ to the outermost ends 12$o$ thereof. According to such a configuration, the outboard middle sipes 12 can gradually come into contact with the ground so that noise generated during running can be reduced. Further, rigidity of the outboard middle land portion 6B gradually changes in the tyre circumferential direction, thus improving riding comfort.

On the other hand, if an angle with respect to the tyre axial direction of the outboard middle sipes 12 becomes too large, wear resistance of the outboard middle land portion 6B tends to be deteriorated. In order to improve ride comfort and wear resistance in a well-balanced manner, an angle with respect to the tyre axial direction of the outboard middle sipes 12, for example, is preferably in a range from 5 to 40 degrees, more preferably from 5 to 30 degrees. In particular, the outboard middle sipes 12 are preferably inclined in the same direction with respect to the tyre axial direction as crown sipes 8. This structure may further improve wear resistance.

Figure 3:
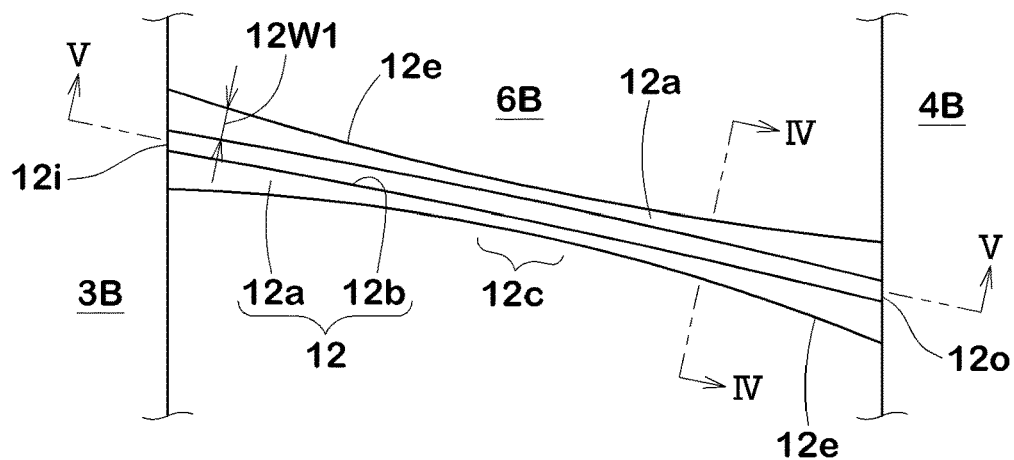
FIG. 3 is an enlarged view of an outboard middle sipe of FIG. 2.
Figure 4:
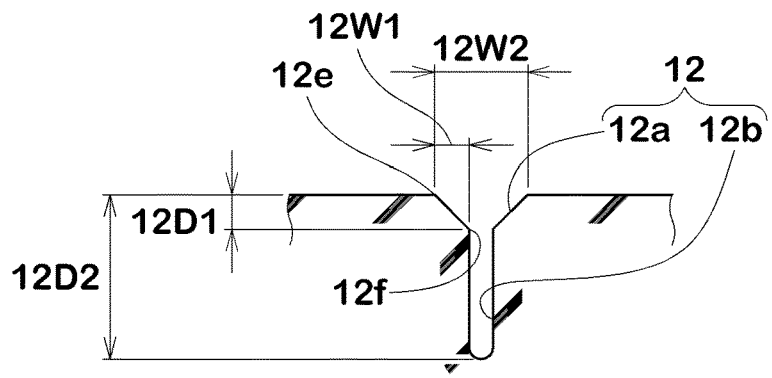
FIG. 4 is a cross-sectional view taken along lines IV-IV of FIG. 3.
Figure 5:
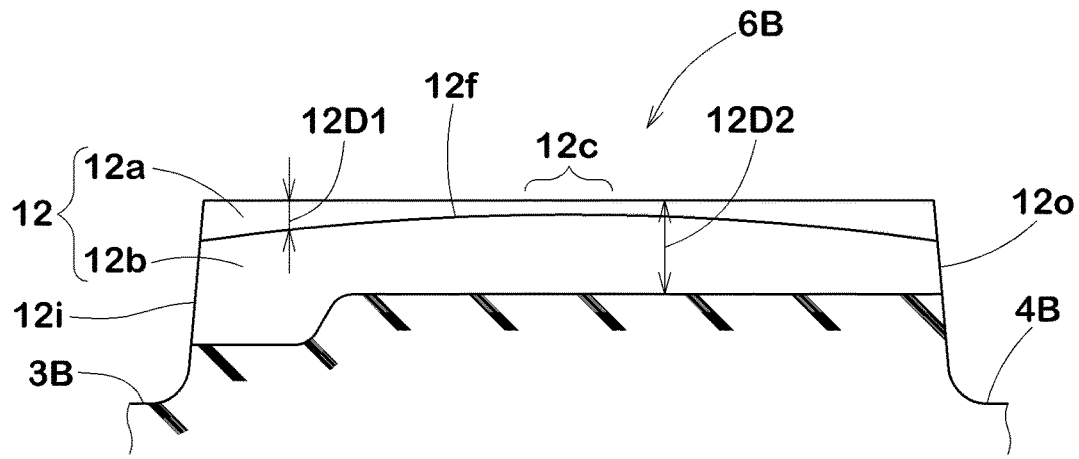
FIG. 5 is a cross-sectional view taken along lines V-V of FIG. 3.

FIG. 3 illustrates an enlarged view of one of the outboard middle sipes 12 of FIG. 2, FIG. 4 illustrates a cross-sectional view taken along lines IV-IV of FIG. 3, and FIG. 5 illustrates a cross-sectional view taken along lines V-V of FIG. 3. As illustrated in FIG. 3 to FIG. 5, the outboard middle sipes 12 each have two opposite sipe-edge portions provided with chamfer portions 12$a$. More specifically, each outboard middle sipe 12 includes a main portion 12$b$ forming a sipe and the chamfer portions 12$a$. Note that each sipe-edge portion means a portion on a ground contact surface side of the sipe, and which portion includes a sipe edge (see reference sign 12$e$) where the sipe and the ground contact surface intersect with each other. This definition applies to other sipes as well.

Each chamfer portion 12$a$ according to the present embodiment is configured like as an inclined surface in which a corner portion formed by a sipe wall of the main portion 12$b$ and the ground contact surface of the outboard middle land portion 6B is cut obliquely. In another aspect, each chamfer portion 12$a$ may be configured as an arcuate roundness or a rectangular recess in the cross-sectional view of FIG. 4 (not illustrated). Each chamfer portion 12$a$ can relax circumferential rigidity of the outboard middle land portion 6B and can further enhance impact mitigation capacity of the outboard middle land portion 6B to improve ride comfort. Furthermore, each chamfer portion 12$a$ can help to reduce impact noise when each sipe edge comes into contact with the ground, improving quietness of the tyre 1.

Each chamfer portion 12$a$ has a chamfer width 12W1. The chamfer width 12W1, as illustrated in FIG. 3 and FIG. 4, is a length from a sipe wall of the main portion 12$b$ to the sipe edge 12$e$ measured in a direction perpendicular to a longitudinal direction of the main portion 12$b$.

When the chamfer width 12W1 of each chamfer portion 12$a$ becomes large, the effect of improving ride comfort increases, but an amount of deformation thereon increases so that wear resistance may deteriorate. On the other hand, when the chamfer width 12W1 becomes too small, further improvement in ride comfort cannot be obtained. In the present embodiment, in order to balance these well, the chamfer widths 12W1 at the both ends of the outboard middle sipes 12 (i.e., the innermost end 12$i$ and the outermost end 12$o$ side) are larger than the chamfer width 12W1 of the central portion 12$c$ in the sipe longitudinal direction of each outboard middle sipe 12. Here, the central portion 12$c$ means a centered portion having 10% of the length of the outboard middle sipe 12.

Such a configuration can reduce rigidity of both ends of the outboard middle land portion 6B while maintaining rigidity of a central portion of the outboard middle land portion 6B. Thus, when the outboard middle land portion 6B comes into contact with the ground, deformation thereof may be promoted at the both ends, and ride comfort can further be improved. On the other hand, in the central portion 12$c$ of each outboard middle sipe 12, rigidity of the outboard middle land portion 6B can be maintained high and wear resistance can be improved. As a result, wear resistance and ride comfort can be improved.

In the present embodiment, the chamfer width 12W1 of each chamfer portion 12$a$ increases from the central portions 12$c$ toward both the innermost end 12$i$ and the outermost end 12$o$. In some preferred embodiments, the chamfer width 12W1 increases continuously. In some more preferred embodiments, as illustrated in FIG. 3, the chamfer width 12W1 of each chamfer portion 12a may increase continuously such that the sipe-edge 12e draws a convex arc (preferably a single convex arc) towards the main portion 12b. Such a configuration can improve wear resistance of the outboard middle land portion 6B while improving ride comfort.

When the chamfer width 12W1 becomes excessively large, wear resistance may de deteriorated. From this view point, the chamfer width 12W1, for example, is preferably from 0.8 to 3.0 mm, more preferably from 1.0 to 2.5 mm. Preferably, the maximum chamfer width 12W1 of each chamfer portion 12a is equal to or more than 1.5 times, more preferably in a range from 2.0 to 3.0 times, the minimum chamfer width 12W1.

As illustrated in FIG. 5, each chamfer portion 12a has a chamfer depth 12D1 that is a length in the tyre radial direction from the ground contact surface of the outboard middle land portion 6B to an inner edge 12f in the tyre radial direction of the chamfer portion 12a. When the chamfer depth 12D1 of each chamfer portion 12a becomes deep, ride comfort may be improved but wear resistance may be deteriorated. In each outboard middle sipe 12 according to the present embodiment, as illustrated in FIG. 5, the chamfer depths 12D1 at the innermost end 12i and the outermost end 12o are greater than the chamfer depth 12D1 at the central portion 12c.

According to the above configuration, deformation of the outboard middle land portion 6B at both side edges can be promoted, and thus ride comfort may further be improved. On the contrary, the central portion 12c of each outboard middle sipe 12 with a small chamfer depth 12D1 maintains high rigidity of the outboard middle land portion 6B and can suppress deterioration of wear resistance of the outboard middle land portion 6B. This effect is even more effective in combination with the preferred configuration of the chamfer width 12W1 described above.

In the present embodiment, the chamfer depth 12D1 of each chamfer portion 12a increases from the central portions 12c toward both the innermost end 12i and the outermost end 12o. In some preferred embodiments, the chamfer depth 12D1 increases continuously. In some more preferred embodiments, as illustrated in FIG. 5, the chamfer depth 12D1 of each chamfer portion 12a may increase continuously such that the inner sipe edge 12e draws a convex arc towards outward in the tyre radial direction. Such a configuration can improve wear resistance of the outboard middle land portion 6B while improving ride comfort.

When the chamfer depth 12D1 becomes excessively deep, wear resistance may be deteriorated. From this view point, the chamfer depth 12D1, for example, is preferably in a range from 0.8 to 3.0 mm, more preferably from 1.0 to 2.5 mm. Preferably, in each chamfer portion 12a, the maximum chamfer depth is equal to or more than 1.5 times, more preferably in a range from 2.0 to 3.0 times, the minimum chamfer depth.

Further, as illustrated in FIG. 4, in order to improve ride comfort and wear resistance at a high level, an opening width 12W2 including the chamfer portions 12a of each outboard middle sipe 12 at the ground contact surface is preferably in a range from 2.4 to 6.0 mm, more preferably in a range from 3.0 to 5.0 mm, for example.

As illustrated in FIG. 5, a depth 12D2 of each outboard middle sipe 12 increases toward the outboard crown circumferential groove 3B. Larger ground pressure tends to act on the outboard middle land portion 6B on the tyre equator C side. Thus, increasing the depth of each outboard middle sipe 12 at the innermost end 12i can be help to improve ride comfort. On the other hand, by reducing the depth of each outboard middle sipes 12 at the outermost end 12o, deformation resistance to a large lateral force during cornering is increased, and thus wear resistance thereof is improved. In the present embodiment, as a preferred embodiment, the depth of each outboard middle sipe 12 changes in a stepped manner including a step, but it may change continuously.

In some more preferred embodiments, in each outboard middle sipe 12, the depth at the innermost end 12i is in a range of from 65% to 85% the maximum depth of the outboard crown circumferential groove 3B, and the depth at the outermost end 12o is in a range of from 45% to 65% of the maximum depth of the outboard crown circumferential groove 3B. With this, ride comfort and wear resistance can be improved in a well-balanced manner.

[Outboard Shoulder Land Portion]

As illustrated in FIG. 2, the outboard shoulder land portion 7B is provided with a plurality of first shoulder sipes 14 (hereinafter, referred to as "first outboard shoulder sipes 14"). In the present embodiment, the outboard shoulder land portion 7B has no lateral groove or circumferential groove other than sipes on the ground contact surface. This helps to improve wear resistance further.

[First Outboard Shoulder Sipes]

Each first outboard shoulder sipe 14, for example, is configured as a full-opened sipe extending so as to connect the outboard shoulder circumferential groove 4B with the outboard tread edge To. Such a first outboard shoulder sipe 14 can enhance impact mitigation ability of the outboard shoulder land portion 7B, which tends to receive large ground contact pressure especially when cornering. Thus, ride comfort can further be improved.

The first outboard shoulder sipes 14, for example, are inclined with respect to the tyre axial direction. The first outboard shoulder sipes 14 according to the present embodiment, with respect to the tyre axial direction, are inclined in the same direction as the outboard middle sipes 12. As a result, ground contacting behavior of an area around both sides of the outboard shoulder circumferential groove 4B, when grounding, is stable, and ride comfort and wear resistance are further improved.

When an angle of the first outboard shoulder sipes 14 with respect to the tyre axial direction becomes excessively large, uneven wear may occur on or around the first outboard shoulder sipes 14. Thus, in order to improve both ride comfort and uneven wear resistance, the angle of the first outboard shoulder sipes 14 is preferably in a range of from 3 to 15 degrees, more preferably 3 to 10 degrees.

In the present embodiment, each first outboard shoulder sipe 14 is arranged so as to be contiguous to a respective one of the middle sipes smoothly via the outboard shoulder circumferential groove 4B. Specifically, in a pair of the adjacent first outboard shoulder sipe 14 and the outboard middle sipe 12 in the tyre axial direction in a tread plan view, when respective sipe centerlines are extended into the outboard shoulder circumferential groove 4B along the respective shapes of the sipes, both extension lines intersect each other or are apart from one another within 2 mm, in the outboard shoulder circumferential groove 4B. Such a configuration may optimize tread rigidity of the inside and outside of the outboard shoulder circumferential groove 4B, leading to excellent ride comfort and wear resistance.

Figure 6:
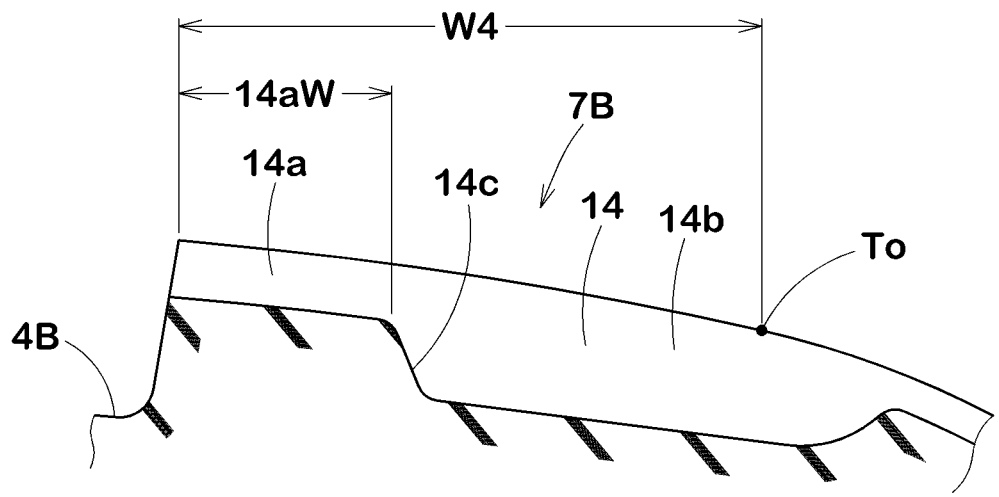
FIG. 6 is a cross-sectional view taken along lines VI-VI of FIG. 2.

FIG. 6 is a cross-sectional view taken along lines VI-VI of FIG. 2. As illustrated in FIG. 6, each first outboard shoulder sipe 14 includes a first portion 14a extending from the outboard shoulder circumferential groove 4B, a second portion 14b connected to the outboard tread edge To and having a greater depth than that of the first portion 14a, and a third portion 14c located therebetween. The third portion 14c has a larger change in depth per unit length than the first portion 14a and the second portion 14b. In the present embodiment, the depth of third portion 14c varies continuously. Such a first outboard shoulder sipe 14 can improve ride comfort while ensuring sufficient rigidity of an inner region of the outboard shoulder land portion 7B in the tyre axial direction.

In order to achieve the above effect more effectively, a length 14aW in the tyre axial direction of the first portion 14a is preferably equal to or more than 10% a width W4 in the tyre axial direction of the outboard shoulder land portion 7B, more preferably equal to or more than 15%, but equal to or less than 50%, more preferably equal to or less than 40%. Similarly, in order to achieve the above effect more effectively, a depth of the first portion 14a is preferably in a range of from 5% to 30% the maximum depth of the outboard shoulder circumferential groove 4B more preferably from 10% to 25%. In some preferred embodiments, the depth of the first portion 14a of each first outboard shoulder sipe 14 is the same as a chamfer depth at the outermost end 12o of each outboard middle sipe 12. Thus, uneven wear can be prevented on both sides in the tyre axial direction of the outboard shoulder circumferential groove 4B.

The depth of the second portion 14b decreases toward the outboard tread edge To continuously. Further, the second portion 14b extends beyond the outboard tread edge To outwardly in the tyre axial direction. Each first outboard shoulder sipe 14 with such a second portion 14b can ensure flexibility of the outboard shoulder land portion 7B in situations where a ground contact patch shifts toward the outboard tread edge To when cornering, thus improving ride comfort.

The maximum depth of the second portion 14b may be in a range of from 45% to 65% the maximum depth of the outboard shoulder circumferential groove 4B, for example, for the purpose of improving ride comfort without deterioration of steering stability.

[Second Outboard Shoulder Sipes]

As illustrated in FIG. 2, in the present embodiment, the outboard shoulder land portion 7B is further provided with a plurality of second shoulder sipes 15 (hereinafter referred to as "the second outboard shoulder sipes 15"). Each second outboard shoulder sipe 15, for example, is configured as a semi-opened sipes that has one end communicated with the outboard tread edge To and the other end terminating within the outboard shoulder land portion 7B so as to form a closed end. Such a second outboard shoulder sipe 15 can further enhance impact mitigation ability of the outboard shoulder land portion 7B, which tends to receive large ground contact pressure especially when cornering, and can further improve ride comfort.

Each second outboard shoulder sipe 15, for example, is inclined with respect to the tyre axial direction. The second outboard shoulder sipes 15 according to the present embodiment are inclined in the same direction with respect to the tyre axial direction as the first outboard shoulder sipes 14. Thus, ground contacting behavior of the outboard shoulder land portion 7B when grounding is stable, and ride comfort and wear resistance can further be improved.

When an angle of the second outboard shoulder sipes 15 with respect to the tyre axial direction becomes too large, uneven wear tends to occur on or around the second outboard shoulder sipes 15. Thus, in order to ensure noise performance and uneven wear resistance, the angle of the second outboard shoulder sipes 15 is preferably in a range of from 3 to 15 degrees, more preferably 3 to 10 degrees. In addition, preferably, the second outboard shoulder sipes 15 may extend in parallel with the first outboard shoulder sipes 14.

In the present embodiment, each second outboard shoulder sipe 15 is arranged such that a block formed between the adjacent first outboard shoulder sipes 14 is bisected in the tyre circumferential direction. According to such a configuration, rigidity in the tyre circumferential direction of the outboard shoulder land portion 7B can uniformalize, and further excellent ride comfort and wear resistance can be obtained.

Figure 7:
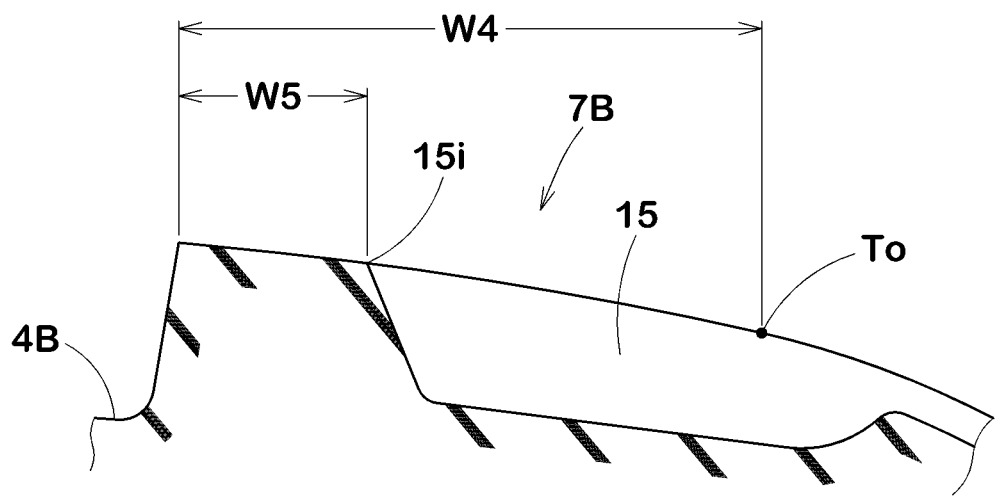
FIG. 7 is a cross-sectional view taken along lines VII-VII of FIG. 2.

FIG. 7 illustrates a cross-sectional view taken along lines VII-VII of FIG. 2. As illustrated in FIG. 7, each second outboard shoulder sipe 15 extends from an inner end 15i thereof outwardly in the tyre axial direction. In the present embodiment, each second outboard shoulder sipe 15 has a depth which decreases continuously outwardly in the tyre axial direction. Such a second outboard shoulder sipe 15 can secure flexibility of the outboard shoulder land portion 7B and improve ride comfort in a situation where the ground contact patch shifts toward the outboard tread edge To when cornering.

In order to exert the above effect effectively, the inner end 15i of each second outboard shoulder sipe 15, for example, is preferably located apart from the outboard shoulder circumferential groove 4B by the distance W5 equal to or more than 10% the width W4 in the tyre axial direction of the outboard shoulder land portion 7B, more preferably equal to or more than 15%, but preferably equal to or less than 50%, more preferably equal to or less than 40%.

In order to further improve ride comfort without deterioration of steering stability, the maximum depth of each second outboard shoulder sipe 15, for example, is equal to or more than 45% but equal to or less than 65% the maximum depth of the outboard shoulder circumferential grooves 4B.

As illustrated in FIG. 2, in the present embodiment, the total number of both first outboard shoulder sipes 14 and second outboard shoulder sipes 15 is twice the total number of the outboard middle sipes 12. Ride comfort of the tyre can be improved by providing twice as many the first and second outboard shoulder sipes 14 and 15 on the outboard shoulder land portion 7B as the outboard middle sipes 12. Further, according to the present embodiment, the first outboard shoulder sipes 14 and the second outboard shoulder sipes 15 are not provided with any chamfer portions. Thus, running noise can be reduced.

The tyre 1 according to the present embodiment can improve ride comfort and wear resistance by the above main configurations, for example. The preferred embodiments of the crown land portion 5, the inboard middle land portion 6A and the inboard shoulder land portion 7A are described below.

[Crown Land Portion]

Figure 8:
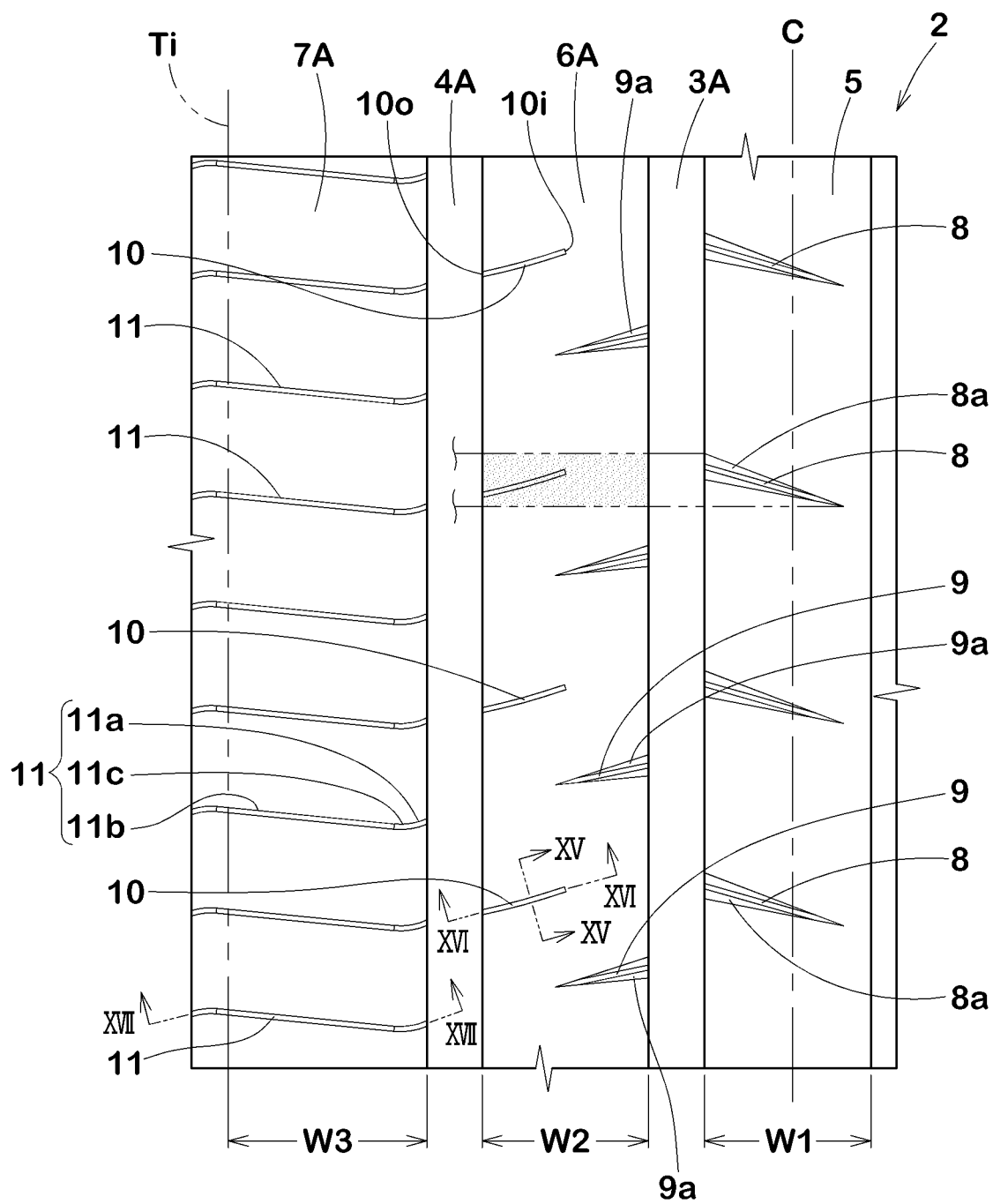
FIG. 8 is a partial enlarged view of FIG. 1 on an inboard tread edge side.

FIG. 8 illustrates a partial enlarged view of FIG. 1 on the inboard tread edge Ti side. As illustrated in FIG. 8, the crown land portion 5 is provided with a plurality of semi-opened crown sipes 8. The crown sipes 8, for example, extend in a straight manner. The crown land portion 5 has no lateral grooves nor circumferential grooves other than sipes. This helps to improve wear resistance further.

As mentioned above, sipes have less deformation during driving than the lateral grooves and lug grooves. In particular, each crown sipe 8 according to the present embodiment is configured as a semi-opened sipe that has only one end opens to either one end of the crown land portion 5, and thus deformation during driving is further suppressed. In addition, each crown sipe 8 can improve impact mitigation ability of the crown land portion 5 and suppress the deterioration of ride comfort. Thus, the crown land portion 5 according to the present embodiment further improves ride comfort and wear resistance.

Figure 9:
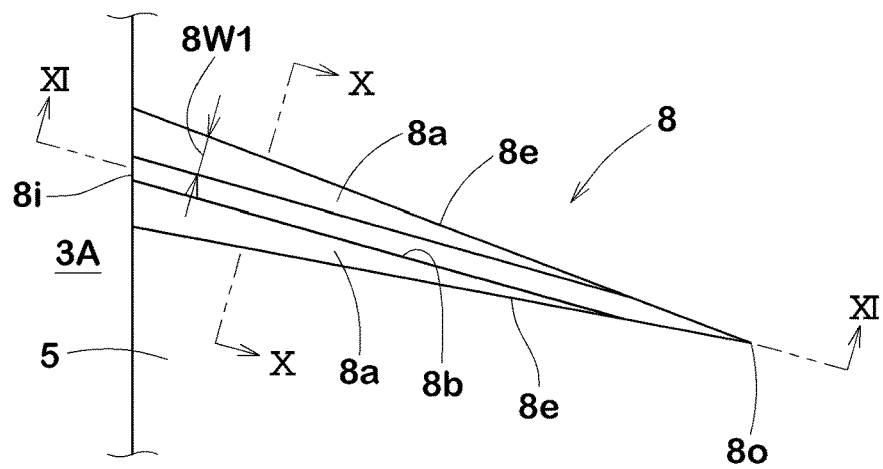
FIG. 9 is an enlarged view of a crown sipe of FIG. 8.
Figure 10:
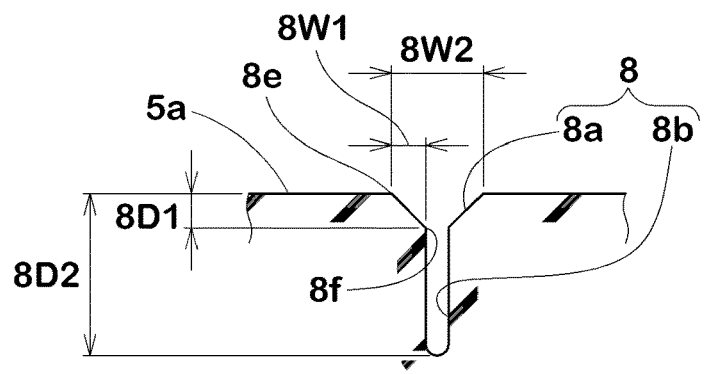
FIG. 10 is a cross-sectional view taken along lines X-X of FIG. 9.
Figure 11:
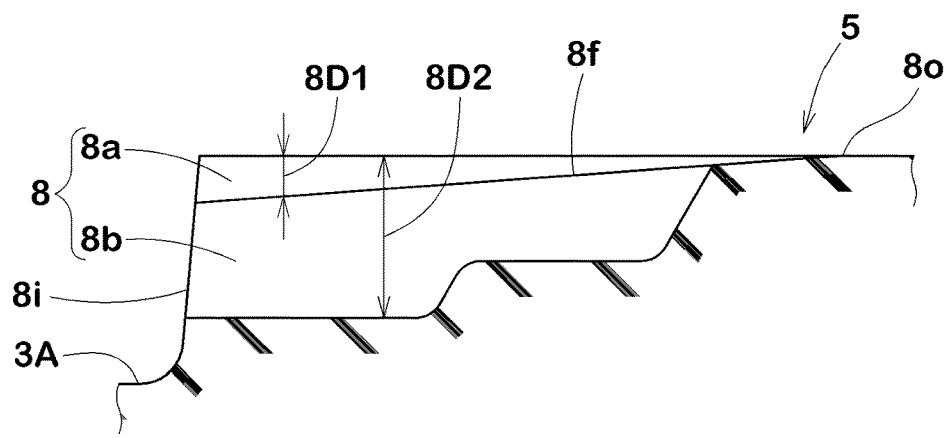
FIG. 11 is a cross-sectional view taken along lines XI-XI of FIG. 9.

FIG. 9 illustrates an enlarged view of a crown sipe of FIG. 8. FIG. 10 and FIG. 11 are cross-sectional views taken along lines X-X and XI-XI of FIG. 9, respectively. As illustrated in FIGS. 9 to 11, the crown sipes 8 each have two opposite sipe-edge portions provided with chamfer portions 8a. More specifically, each crown sipe 8 includes a main portion 8b forming the sipe and a pair of chamfer portions 8a.

Each chamfer portion 8a according to the present embodiment is configured like as an inclined surface in which a corner portion formed by a sipe wall of the main portion 8b and a ground contact surface 5a of the crown land portion 5B is cut obliquely. In another aspect, each chamfer portion 8a may be configured as an arcuate roundness or a rectangular recess in the cross-sectional view thereof (not illustrated). Each chamfer portion 8a can enhance impact mitigation capacity of the crown land portion 5, improving ride comfort, without deterioration of excellent wear resistance. Furthermore, each chamfer portion 8a can help to reduce impact noise when each sipe-edge portion comes into contact with the ground, improving quietness of the tyre 1.

Each crown sipe 8 according to the present embodiment includes a closed end 8o terminating within the crown land portion 5 and an opening end 8i connected to the inboard crown circumferential groove 3A. Recent years, many automobiles employ a negative camber structure. Thus, the crown land portion 5 on the inboard tread edge Ti side tends to receive large ground contact pressure, and impact mitigation ability thereof is important for ride comfort. The crown sipes 8 according to the present embodiment can relatively enhance the impact mitigation ability on the inboard crown circumferential groove 3A side of the crown land portion 5, further improving ride comfort.

Each chamfer portion 8a has a chamfer width 8W1. As illustrated in FIG. 9 and FIG. 10, the chamfer width 8W1 is a length from a sipe wall of the main portion 8b to a sipe edge 8e measured perpendicular to the longitudinal direction of the main portion 8b. Further, each chamfer portion 8a has a chamfer depth 8D1 from the ground contact surface 5a to an inner edge 8f in the tyre radial direction of the chamfer portion 8a.

When the chamfer width 8W1 of the chamfer portion 8a becomes large, ride comfort may be improved, but large deformation when driving tends to occur. In the present embodiment, As illustrated in FIG. 9, the chamfer width 8W1 of the chamfer portion 8a increases from the closed end 8o toward the opening end 8i (i.e., the inboard crown circumferential groove 3A side).

The above configuration can enhance effectively impact mitigation ability on the inboard crown circumferential groove 3A side of the crown land portion 5, which tends to receive large ground contact pressure, and further improves ride comfort. Further, a portion on the closed end 8o side having a relatively smaller chamfer width 8W1 can suppress deformation there around when driving. In some preferred embodiments, the chamfer width 8W1 may increase continuously. In some more preferred embodiments, as illustrated in FIG. 9, each sipe edge 8e is inclined with respect to the main portion 8b and extends in a straight manner such that the chamfer width 8W1 increases continuously at a constant rate.

When the chamfer depth 8D1 of the chamfer portion 8a becomes large, ride comfort may be improved, but large deformation when driving tends to occur. In the present embodiment, as illustrated in FIG. 11, the chamfer depth 8D1 of the chamfer portion 8a increases from the closed end 8o toward the opening end 8i. Such a configuration can exert the same effect as above. In some preferred embodiments, the chamfer depth 8D1 may increase continuously. In some more preferred embodiments, as illustrated in FIG. 11, the inner edge 8f of each chamfer depth 8D1 is inclined with respect to the ground contact surface 5a, and extends in a straight manner such that the chamfer depth 8D1 increases continuously at a constant rate.

On the other hand, the chamfer width 8W1 or the chamfer depth 8D1 becomes excessively large, wear resistance tends to be deteriorated. From this view point, the chamfer width 8W1 and the chamfer depth 8D1, for example, are preferably in a range of from 0.8 to 3.0 mm, more preferably from 1.0 to 2.5 mm.

For the purpose of improving ride comfort and wear resistance at a high level, as illustrated in FIG. 10, an opening width 8W2 including the pair of chamfer portions 8a of each crown sipes 8 at the ground contact surface 5a is in a range from 2.4 to 6.0 mm, more preferably from 3.0 to 5.0 mm, for example.

As illustrated in FIG. 11, the depth 8D2 of each crown sipe 8 increases toward the inboard crown circumferential groove 3A. Such a crown sipe 8 can enhance effectively impact mitigation ability on the inboard crown circumferential groove 3A side of the crown land portion 5, which tends to receive large ground contact pressure, and further improves ride comfort. Further, the depth of each crown sipe 8 on the closed end 8o side is relatively small, deformation there around when driving can be reduced. In the present embodiment, as a preferred embodiment, the depth of the crown sipes changes in a stepped manner having two or more steps. Alternatively, the depth may change continuously.

When the depth 8D2 of the crown sipes 8 become excessively deep, deformation of the crown sipes 8 when driving may be large. From this view point, the maximum depth 8D2 of each crown sipe 8, for example, is equal to or less than 90%, more preferably in a range of from 50% to 85% the maximum depth of the inboard crown circumferential groove 3A.

Referring back to FIG. 8, the crown sipes 8, for example, extends across the tyre equator C. In addition, a length in the tyre axial direction of each crown sipe 8 is preferably equal to or more than 40%, more preferably equal to or more than 50%, still further preferably equal to or more than 55%, the width W1 in the tyre axial direction of the crown land portion 5. As a result, ride comfort can further be improved. The width of the land portion means the distance in the tyre axial direction between the ground contact edges of the land portion under the normal loaded condition.

The crown sipes 8, for example, are inclined with respect to the tyre axial direction. Since such a crown sipe 8 gradually comes into contact with the ground from one end to the other end, impact noise generated by the crown sipes 8 when grounding is reduced and ride comfort can be improved. In order to further improve the effect, an angle of the crown sipes 8 with respect to the tyre axial direction, for example, is in a range from 5 to 40 degrees, more preferably from 5 to 30 degrees. Note that an angle of a sipe with respect to the tyre axial direction means an angle with respect to the tyre axial direction of a sipe centerline that extends on the center location in a width direction of the sipe.

[Inboard Middle Land Portion]

As illustrated in FIG. 8, in the present embodiment, the inboard middle land portion 6A is provided with a plurality of first inboard middle sipes 9 with chamfer portions 9a and a plurality of second inboard middle sipes 10 without having chamfer portions, which are arranged alternately in the tyre circumferential direction. By providing both the first inboard middle sipes 9 and the second inboard middle sipes 10 as described above, ride comfort and quietness can be improved without deteriorating wear resistance. The inboard middle land portion 6A according to the present embodiment has no lateral grooves nor circumferential grooves other than sipes. This helps to further improve wear resistance of the tyre 1.

[First Inboard Middle Sipes]

Figure 12:
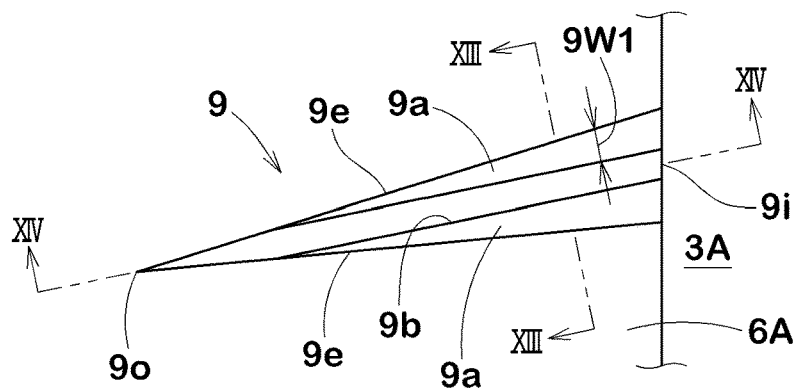
FIG. 12 is an enlarged view of a first inboard middle sipes of FIG. 8.
Figure 13:
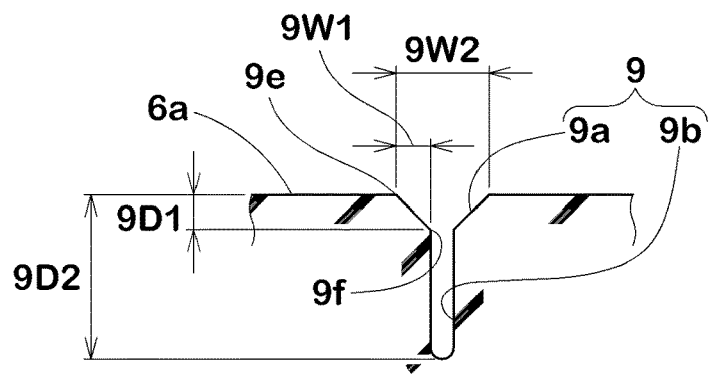
FIG. 13 is a cross-sectional view taken along lines XIII-XIII of FIG. 12.
Figure 14:
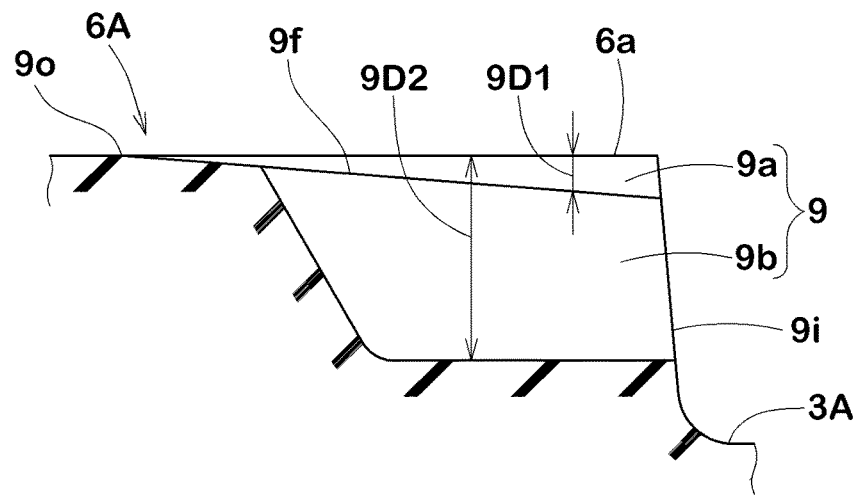
FIG. 14 is a cross-sectional view taken along lines XIV-XIV of FIG. 12.

FIG. 12 illustrates an enlarged view of one of the first inboard middle sipes 9 of FIG. 8. FIG. 13 and FIG. 14 illustrate cross-sectional views taken along lines XIII-XIII and XIV-XIV, respectively. As illustrated in FIGS. 12 to 14, the first inboard middle sipes 9 each have two opposite sipe-edge portions provided with chamfer portions 9a. More specifically, each first inboard middle sipe 9 includes a main portion 9b forming the sipe and a pair of the chamfer portions 9a.

Each chamfer portion 9a according to the present embodiment is configured like as an inclined surface in which a corner portion formed by a sipe wall of the main portion 9b and the ground contact surface 6a of the inboard middle land portion 6B is cut obliquely. In another aspect, each chamfer portion 9a may be configured as an arcuate roundness or a rectangular recess in the cross-sectional view thereof (not illustrated). Each chamfer portion 9a can enhance impact mitigation capacity of the inboard middle land portion 6B, thus improving ride comfort without deterioration of excellent wear resistance. Furthermore, each chamfer portion 9a can help to reduce impact noise when each sipe-edge portion comes into contact with the ground, thus improving quietness of the tyre 1.

Each first inboard middle sipe 9 includes a closed end 90 terminating within the inboard middle land portion 6A, and an opening end 9i connected to the inboard crown circumferential groove 3A. Due to a negative camber alignment of automobiles, the inboard middle land portion 6A tends to receive larger ground contact pressure, and impact mitigation ability thereof is important for ride comfort. The first inboard middle sipes 9 according to the present embodiment can enhance the impact mitigation ability of the inboard middle land portion 6A and can further improve ride comfort.

Each chamfer portion 9a has a chamfer width 9W1. As illustrated in FIG. 12 and FIG. 13, the chamfer width 9W1 is a length from a sipe wall of the main portion 9b to the sipe edge 9e measured perpendicular to the longitudinal direction of the main portion 9b. Further, each chamfer portion 9a has a chamfer depth 9D1 which is a length from the ground contact surface 6a to the inner edge 9f in the tyre radial direction of the chamfer portion 9a.

When the chamfer width 9W1 of each chamfer portion 9a becomes large, ride comfort may be improved, but wear resistance tends to be deteriorated. In the present embodiment, as illustrated in FIG. 12, the chamfer width 9W1 of each chamfer portion 9a increases from the closed end 90 toward the opening end 9i (i.e., the inboard crown circumferential groove 3A side). Such a configuration can effectively enhance impact mitigation ability of the inboard middle land portion 6A on the tyre equator side, which tends to receive large ground contact pressure, and further improves ride comfort. In addition, the portion where the chamfer width 9W1 on the closed end 90 side is relatively small can suppress deterioration of wear resistance. In some preferred embodiments, the chamfer width 9W1 may increase continuously. In some more preferred embodiments, as illustrated in FIG. 12, the sipe edge 9e extends in a straight manner with an inclination with respect to the main portion 9b so that the chamfer width 9W1 may increase continuously at a constant rate.

Further, when the chamfer depth 9D1 of each chamfer portion 9a becomes large, ride comfort may be improved, but wear resistance tends to be deteriorated. In the present embodiment, as illustrated in FIG. 14, the chamfer depth 9D1 of each chamfer portion 9a increases from the closed end 90 toward the opening end 9i (i.e., the inboard crown circumferential groove 3A side). Such a configuration can exert the same effect as above. In some preferred embodiments, the chamfer depth 9D1 may increase continuously. In some more preferred embodiments, as illustrated in FIG. 14, the inner edge 9f of each chamfer portion 9a extends in a straight manner with an inclination with respect to the ground contact surface 6a so that each chamfer depth 9D1 increases continuously at a constant rate.

When the chamfer width 9W1 or the chamfer depth 9D1 becomes excessively large, wear resistance may de deteriorated due to the first inboard middle sipes 9 as described above. From this view point, the chamfer width 9W1, for example, is preferably in a range from 0.8 to 3.0 mm, more preferably in a range from 1.0 to 2.5 mm. Similarly, the chamfer depth 9D1, for example, is preferably in a range from 0.8 to 3.0 mm, more preferably in a range from 1.0 to 2.5 mm.

As illustrated in FIG. 13, an opening width 9W2 including the pair of chamfer portions 9a at the ground contact surface 6a of each first inboard middle sipe 9 is preferably in a range from 2.4 to 6.0 mm, more preferably in a range from 3.0 to 5.0 mm, for the purpose of ensuring ride comfort and wear resistance at a high level.

As illustrated in FIG. 14, a depth 9D2 of each first inboard middle sipe 9 increases toward the inboard crown circumferential groove 3A. Such a first inboard middle sipe 9 can effectively enhance impact mitigation ability on the inboard crown propagate groove 3A side of the crown land portion 5, which tends to receive large ground contact pressure, and further improves ride comfort. Further, since the depth of each first inboard middle sipe 9 on the closed end 90 side is relatively small, deterioration of wear resistance can be prevented. In the present embodiment, as a preferred embodiment, after the depth of each first inboard middle sipe 9 increases continuously, the depth keeps constant to the inboard crown circumferential groove 3A. Alternatively, the depth can increase continuously over the entire length.

When the depth 9D2 of each first inboard middle sipe 9 becomes excessively large, wear resistance may be deteriorated due to the first inboard middle sipes 9. From this view point, the maximum value of the depth 9D2 of each first inboard middle sipe 9, for example, is equal to or less than 90% the maximum depth of the inboard crown circumferential groove 3A, more preferably in a range of 50% to 95%.

Referring back to FIG. 8, a length in the tyre axial direction of each first inboard middle sipe 9, for example, is equal to or more than 35% the width W2 in the tyre axial direction of the inboard middle land portion 6A, more preferably equal to or more than 40%. Thus, ride comfort can further be improved. On the other hand, since the second inboard middle sipes 10 are also provided on the inboard middle land portion 6A, the length in the tyre axial direction of the first inboard middle sipes 9 is preferably smaller than the length in the tyre axial direction of the crown sipes 8. In particular, the length in the tyre axial direction of the first inboard middle sipes 9 is preferably less than 60% the width W2 in the tyre axial direction of the inboard middle land portion 6A.

Each first inboard middle sipe 9, for example, is inclined with respect to the tyre axial direction. Since such a first inboard middle sipe 9 comes into contact with the ground from one end to the other end gradually, impact noise when grounding of each first inboard middle sipe 9 is reduced and ride comfort can be improved. To enhance this effect, an angle of each first inboard middle sipe 9 with respect to the tyre axial direction, for example, is preferably in a range of from 5 to 40 degrees, more preferably in a range of from 5 to 30 degrees. Although not limited, each first inboard middle sipe 9 is preferably inclined in the opposite direction to the crown sipes 8 with respect to the tyre axial direction.

As apparent from FIG. 8, the first inboard middle sipes 9 are arranged so as not to overlap the crown sipes 8 in the tyre circumferential direction. That is, when the crown sipes 8 are projected onto the inboard middle land portion 6A parallel with the tyre axial direction, any portions of the first inboard middle sipes 9 are not included in the projected regions (one is shown lightly colored in FIG. 8). In this way, the sipes 8 and 9 having the chamfer portions 8a and 9a, respectively, are alternately arranged in the tyre circumferential direction, local decrease in rigidity of a land portion around the inboard crown circumferential groove 3A can be suppressed, further improving ride comfort and wear resistance. In addition, noise generated by the sipes 8 and 9 during driving can be dispersed, and quietness of the tyre can be improved.

[Second Inboard Middle Sipes]

Figure 15:
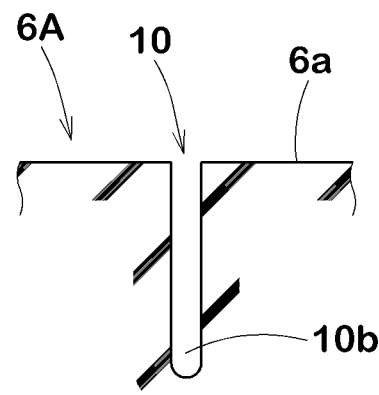
FIG. 15 is a cross-sectional view taken along lines XV-XV of FIG. 8.

As illustrated in FIG. 8, each second inboard middle sipe 10 has an opening end 10o connected to the inboard shoulder circumferential groove 4A and a closed end 10i terminating within the inboard middle land portion 6A. FIG. 15 illustrates a cross-sectional view taken along a line XV-XV of FIG. 8. As illustrated in FIG. 15, in the present embodiment, the second inboard middle sipes 10 each have two opposite sipe-edge portions where no chamfer portion is provided. That is, each second inboard middle sipe 10 consists of a main portion 10b forming a sipe. In each second inboard middle sipe 10, the main portion 10b has a pair of sipe walls that is connected to the ground contact surface 6a at a substantially right angle (for example, 90 degrees plus/minus 3 degrees).

In this way, the inboard middle land portion 6A is provided with the first inboard middle sipes 9 provided with the chamfer portions 9a and the second inboard middle sipes 10 without a chamfered portion alternately, ride comfort can be improved without impairing wear resistance of the tyre 1. In addition, by alternately arranging the first inboard middle sipes 9 and the second inboard middle sipes 10, rigidity of each land piece divided by the sipes of the inboard middle land portion 6A is optimized, ensuring better ride comfort and quietness of the tyre.

Figure 16:
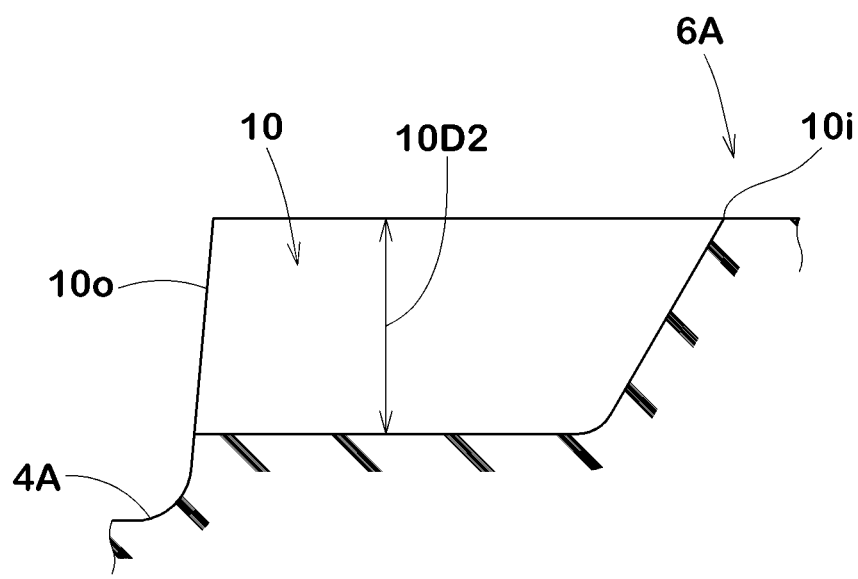
FIG. 16 is a cross-sectional view taken along lines XVI-XVI of FIG. 8.

FIG. 16 illustrates a cross-sectional view taken along lines XVI-XVI of FIG. 8. As illustrated in FIG. 16, a depth 10D2 of each second inboard middle sipe 10 increases toward the inboard shoulder circumferential groove 4A. Such a second inboard middle sipes 10 can effectively enhances impact mitigation ability of the inboard middle land portion 6A on the inboard shoulder circumferential groove 4A side, which tends to receive large ground contact pressure, and further improves ride comfort. Further, since the depth of each second inboard middle sipe 10 on the closed end 10i side is relatively small, deterioration of wear resistance can be prevented. In the present embodiment, as a preferred embodiment, after the depth of each second inboard middle sipe 10 increases continuously, the depth keeps constant to the inboard shoulder circumferential groove 4A. Alternatively, the depth can increase continuously over the entire length.

When the depth 10D2 of each second inboard middle sipe 10 becomes excessively large, wear resistance may be deteriorated due to the second inboard middle sipes 10. From this view point, the maximum value of the depth 10D2 of each second inboard middle sipe 10, for example, is equal to or less than 90% the maximum depth of the inboard crown circumferential groove 3A, more preferably in a range of 50% to 95%. Preferably, the maximum value of the depth 10D2 of the second inboard middle sipes 10 is the same as the maximum value of the depth 9D2 of the first inboard middle sipes 9.

Referring back to FIG. 8, a length in the tyre axial direction of the second inboard middle sipes 10, for example, is preferably equal to or more than 35% the width W2 in the tyre axial direction of the inboard middle land portion 6A, more preferably equal to or more than 40%. Thus, ride comfort of the tyre can further be improved. On the other hand, since the first inboard middle sipes 9 are also provided on the inboard middle land portion 6A, the length in the tyre axial direction of the second inboard middle sipes 10 is preferably smaller than the length in the tyre axial direction of the crown sipes 8. In particular, the length in the tyre axial direction of the second inboard middle sipes 9 is preferably less than 60% the width W2 in the tyre axial direction of the inboard middle land portion 6A. Preferably, the second inboard middle sipes 10 are arranged so as to overlap the first second inboard middle sipes 9 in the tyre axial direction. This structure may further improve ride comfort.

Each second inboard middle sipe 10, for example, is inclined with respect to the tyre axial direction. Since such a second inboard middle sipe 10 comes into contact with the ground from one end to the other end gradually, impact noise when grounding of each second inboard middle sipe 10 is reduced and ride comfort can be improved. To enhance this effect, an angle of each second inboard middle sipe 10 with respect to the tyre axial direction, for example, is preferably in a range of from 5 to 40 degrees, more preferably in a range of from 5 to 30 degrees. Although not limited, each second inboard middle sipe 9 is preferably inclined in the same direction as the first inboard middle sipes 9 with respect to the tyre axial direction. More preferably, the second inboard middle sipes 10 extend in parallel with the first inboard middle sipes 9.

As apparent from FIG. 8, the second inboard middle sipes 10 are arranged so as to overlap the respective crown sipes 8 in the tyre circumferential direction. That is, when the crown sipes 8 are projected onto the inboard middle land portion 6A along the tyre axial direction, the second inboard middle sipes 10 are arranged are included in the respective the projected portions (one is shown lightly colored in FIG. 8), at least partially. Preferably, the entire portions of the second inboard middle sipes 10 are included in the respective projected portions. This structure may improve wear resistance and ride comfort in a well-balanced manner.

In the present embodiment, a total number of the first inboard middle sipes 9 and a total number of the second inboard middle sipes 9 each are the same as a total number of the crown sipes 8. These sipes are arranged in the tyre circumferential direction at constant or variable pitches. The total number of sipes on the inboard middle land portion 6A is twice the total number of sipes on the crown land portion 5.

[Inboard Shoulder Land Portion]

As illustrated in FIG. 8, in the present embodiment, the inboard shoulder land portion 7A is provided with shoulder sipes (hereinafter, referred to as inboard shoulder sipes) 11. In the present embodiment, a ground contact surface of the inboard shoulder land portion 7A has no lateral grooves nor circumferential grooves other than sipes. This helps to further improve wear resistance of the tyre 1.

The inboard shoulder sipes 11, for example, extend from the inboard shoulder circumferential groove 4A to the inboard tread edge Ti (i.e., full-opened sipes). Such inboard shoulder sipes 11 can enhance impact mitigation ability of the inboard shoulder land portion 7A, which tends to receive large ground contact pressure. Thus, riding comfort can further be improved.

Figure 17:
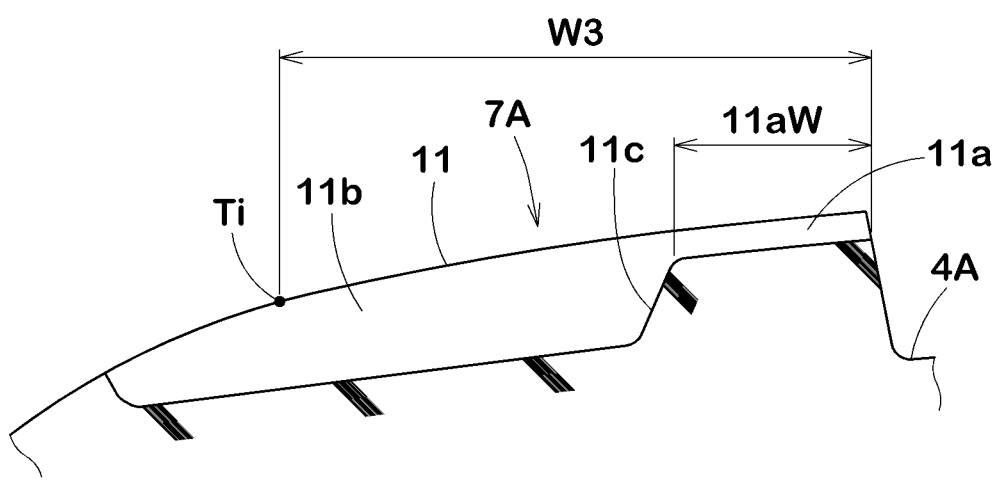
FIG. 17 is a cross-sectional view taken along lines XVII-XVII of FIG. 8.

FIG. 17 illustrates a cross-sectional view taken along lines XVII-XVII of FIG. 8. As illustrated in FIG. 17, each of the inboard shoulder sipes 11 includes a first portion 11a connected to the inboard shoulder circumferential groove 4A, a second portion 11b extending from the inboard tread edge Ti and having a depth greater than that of the first portion 11a, and a third portion 11c arranged therebetween. The third portion 11c has a larger change in depth per unit length than the first portion 11a and the second portion 11b. In the present embodiment, the depth of third portion 11c varies continuously. Such an inboard shoulder sipe 11 can improve ride comfort while ensuring sufficient rigidity of an inner region of the inboard shoulder land portion 7A in the tyre axial direction.

In order to achieve the above effect more effectively, a length 11aW in the tyre axial direction of the first portion 11a is preferably equal to or more than 10% a width W3 in the tyre axial direction of the inboard shoulder land portion 7A, more preferably equal to or more than 15%, but equal to or less than 50%, more preferably equal to or less than 40%. Similarly, in order to achieve the above effect more effectively, a depth of the first portion 11a is preferably in a range of from 5% to 30% the maximum depth of the inboard shoulder circumferential groove 4A more preferably from 10% to 25%.

The depth of each second portion 11b decreases continuously toward the inboard tread edge Ti. Further, each second portion 11b extends beyond the inboard tread edge Ti outwardly in the tyre axial direction. Each inboard shoulder sipe 11 with such a second portion 11b can ensure flexibility of the inboard shoulder land portion 7A in situations where a ground contact patch shifts toward the inboard tread edge Ti when cornering, thus improving ride comfort.

The maximum depth of the second portion 11b may be equal to or more than 50% the maximum depth of the inboard shoulder circumferential groove 4A, more preferably equal to or more than 60%, but preferably equal to or less than 90%, more preferably equal to or less than 80%, for the purpose of improving ride comfort without deterioration of steering stability.

As illustrated in FIG. 8, each inboard shoulder sipe 11 is inclined with respect to the tyre axial direction. In each inboard shoulder sipe 11 according to the present embodiment, the first portion 11a is inclined in a first direction with respect to the tyre axial direction, the second portion 11b is inclined in a second direction which is an opposite side to the first direction with respect to the tyre axial direction. Further, the inclination of each inboard shoulder sipes 11 varies continuously smoothly within a range of the third portion 11c. Such an inboard shoulder sipe 11 can provide sipe edges in multiple directions when a slip angle is given, while suppressing deterioration of wear resistance, helping to exert excellent steering stability.

In some preferred embodiment, each first portion 11a is inclined in the same direction as the second inboard middle sipes 10. As a result, ground contacting behavior when grounding is stable in an area around both sides of the inboard shoulder circumferential groove 4A, and riding comfort and wear resistance are further improved.

When angles of the first portions 11a and the second portions 11b with respect to the tyre axial direction become too large, uneven wear tends to occur on or around the inboard shoulder sipes 11. Thus, in order to ensure noise performance and uneven wear resistance, the angles of the first portions 11a and the second portions 11b are preferably in a range of from 3 to 15 degrees, more preferably 3 to 10 degrees with respect to the tyre axial direction.

The total number of inboard shoulder sipes 11, for example, is greater than the total number of the crown sipes 8. In the present embodiment, the total number of the inboard shoulder sipes 11 is twice the total number of the crown sipes 8. Similarly, the total number of the inboard shoulder sipes 11 is greater than the total number of the second inboard middle sipes 10 (e.g., twice). By providing more full-opened inboard shoulder sipes 11 on the inboard shoulder land portion 7A, ride comfort can be further improved. In addition, the inboard shoulder sipes 11 of the present embodiment each have no chamfer portion, and thus deterioration of wear resistance can be suppressed.

In the present embodiment, some of the inboard shoulder sipes 11 are arranged contiguous to the respective second inboard middle sipes 10 smoothly via the inboard shoulder circumferential groove 4A. Specifically, in a pair of adjacent one of the inboard shoulder sipes 11 and one of the second inboard middle sipes 10 in the tyre axial direction in a tread plan view, when respective sipe centerlines are extended into the inboard shoulder circumferential groove 4A along the respective shapes of the sipes, both extension lines intersect each other or are apart from one another within 2 mm, in the inboard shoulder circumferential groove 4A. Such a configuration may optimize tread rigidity of the inside and outside of the inboard shoulder circumferential groove 4A, leading to excellent ride comfort and wear resistance.

Although some embodiments of the present disclosure have been described in detail above, the present disclosure is not limited to the above-mentioned specific disclosure, but can be modified various aspects within the scope of the claims. For example, the middle land portion and the shoulder land portion according to claim 1 of the present disclosure may be applied to the inboard middle land portion 6A and the inboard shoulder land portion 7A on the inboard tread edge Ti side, respectively.

EXAMPLE

Example 1

In order to confirm the effect of the present disclosure, passenger car pneumatic tyres (225/45R18 95W) having the basic tread pattern of FIG. 1 were prototyped based on the specification shown in Table 1 (Examples). Then, these tyres were tested for ride comfort and wear resistance.

Figure 18:
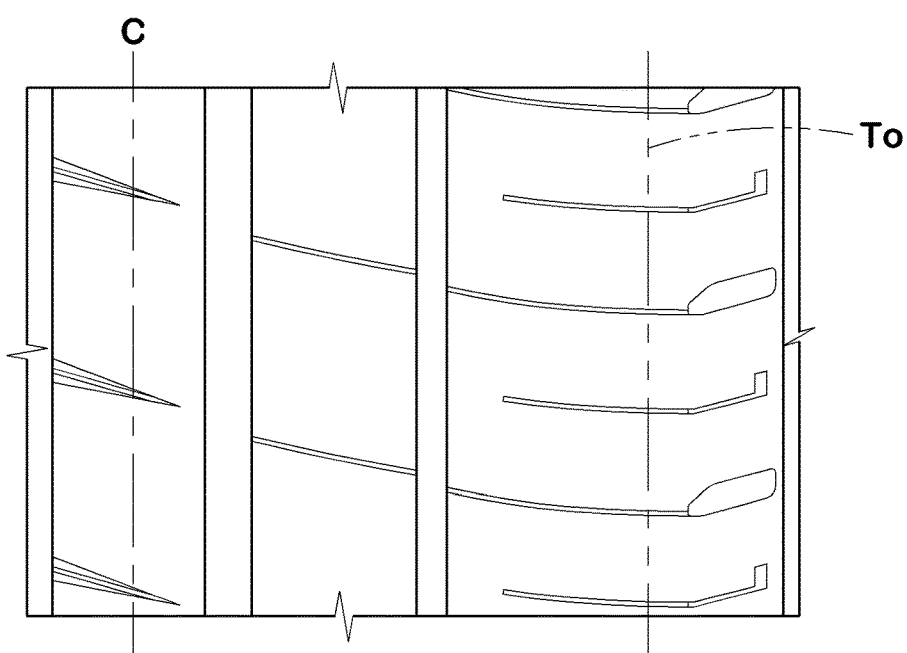
FIG. 18 is an enlarged view of a major part of a tread pattern of a tyre according to comparative example 1.
Figure 19:
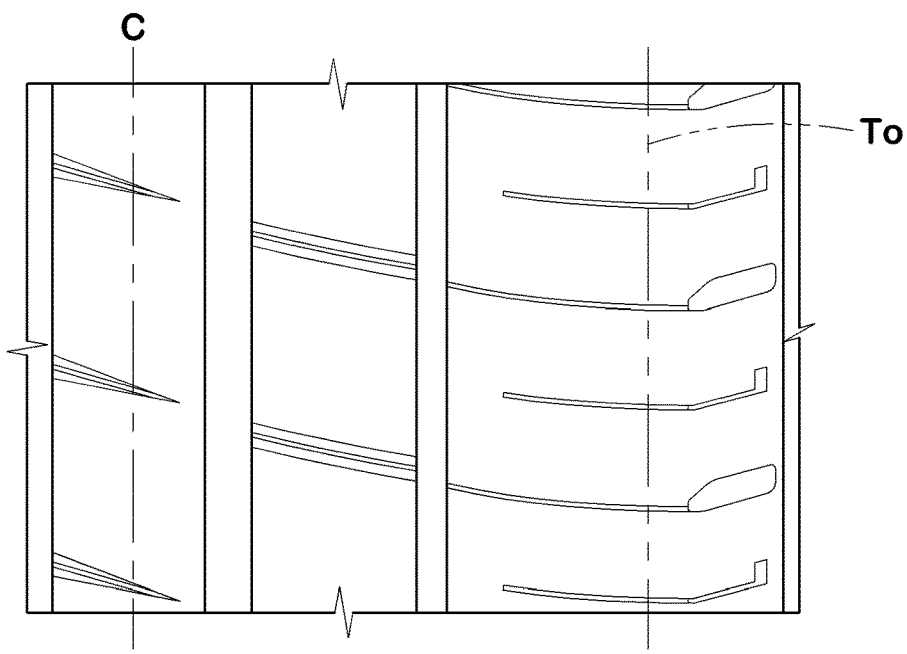
FIG. 19 is an enlarged view of a major part of a tread pattern of a tyre according to comparative example 2.

Further, for comparison, tyres with the outboard middle land portion as shown in FIG. 18 and FIG. 19 were also tested. The outboard middle land portion of the tyre of FIG. 18 (Ref 1) is provided with a full-opened middle sipes without any chamfer portions, and the outboard middle sipes of the tyre of FIG. 19 (Ref. 2) has a constant chamfer width and a chamfered depth. In addition, Ref. 1 and Ref. 2 have the same pattern as the Examples except for the configuration of the outboard middle land portion. The width of the main portions of the sipes was 0.8 mm for each tyre. The following are the main common specifications of the examples.

[Outboard Middle Sipes]
  Sipe depth 12D2: outer end 3.7 mm, inner end 5.7 mm
  Chamfer depth 12D1: 0.5 to 2.0 mm
  Angle with respect to tyre axial direction: 12 deg.
[First Outboard Shoulder Sipes (No Chamfer Portions)]
  Sipe depth (maximum): 5.7 mm
  Depth of first portions: 1.5 mm
  Angle with respect to tyre axial direction: about 10 deg.
[Second Outboard Shoulder Sipes (No Chamfer Portion)]
  Sipe depth (maximum): 5.7 mm
  Ratio W5/W4: 32%
  Angle with respect to tyre axial direction: about 10 deg.
[Crown Sipes]
  Chamfer width 8W1: 0 to 1.5 mm
  Chamfer depth 8D1: 0 to 1.8 mm
  Sipe depth 8D2 (maximum): 5.7 mm
  Opening width 8W2: 0 to 3.8 mm
  Length in tyre axial direction with respect to land width W1: 75%
  Angle with respect to tyre axial direction: 18 deg.
[First Inboard Middle Sipes]
  Chamfer width 9W1: 0 to 1.0 mm
  Chamfer depth 9D1: 0 to 1.6 mm
  Sipe depth 9D2 (maximum): 5.7 mm
  Opening width 9W2: 0 to 2.8 mm
  Length in tyre axial direction to land width W2: 55%
  Angle with respect to tyre axial direction: 12 deg.
[Second Inboard Middle Sipes (No Chamfer Portion)]
  Sipe depth 10D2 (maximum): 5.7 mm
  Length in tyre axial direction to land width W2: 50%
  Angle with respect to tyre axial direction: 12 deg.
[Inboard Shoulder Sipes (No Chamfer Portion)]
  Sipe depth (maximum): 5.7 mm
  Depth of first portion: 2.5 mm
  Angle of first portions: 8 deg.
  Angle of second portions: 8 deg. (opposite direction to first portions)

As to ride comfort, a 2500 cc FR passenger car with test tyres mounted on four wheels was run on a circuit to evaluate the ride comfort by the driver's sensuality. The test results are shown in Table 1 with Ref. 1 as 100, and the larger the value, the better. The tyre mounting conditions used in the test are as follows.

Rim size: 18×7.5 J
Tyre inner pressure: 220 kPa

As to wear resistance, a tyre model was created for the numerical calculation of each tyre, and the wear resistance of the outboard middle land portion and the outboard shoulder land portion was calculated by computer simulation. The test results are shown in Table 1 with Ref 1 as 100, and the larger the value, the better.

Table 1 shows the test results.

TABLE 1

|  | Ref. 1 | Ref. 2 | Ex. |
|---|---|---|---|
| Tread pattern | FIG. 18 | FIG. 19 | FIG. 1 |
| Chamfer width 12W1 of outboard middle sipes (mm) | 0 | 1.5 (constant) | 0.5 to 1.8 |
| Chamfer depth 12D1 of outboard middle sipes (mm) | 0 | 1.5 (constant) | 0.5 to 2.0 |
| Ride comfort (score) | 100 | 102 | 105 |
| Wear resistance (score) | 100 | 101 | 102 |

As a result of the test, it was confirmed that the tyres of the examples improve ride comfort and wear resistance.

Example 2

Passenger car pneumatic tyres (225/45R18 95W) having the basic tread pattern of FIG. 1 were prototyped based on the specification shown in Table 2 (Examples 1 and 2). Then, these tyres were tested for ride comfort and quietness.

Figure 20:
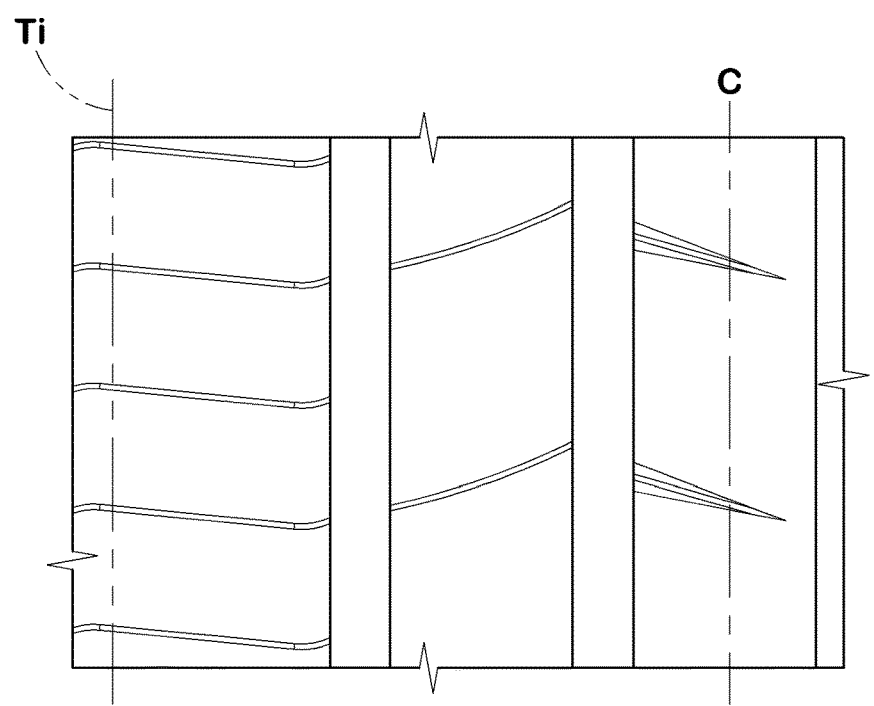
FIG. 20 is an enlarged view of a major part of a tread pattern of a tyre according to comparative example 3.
Figure 21:
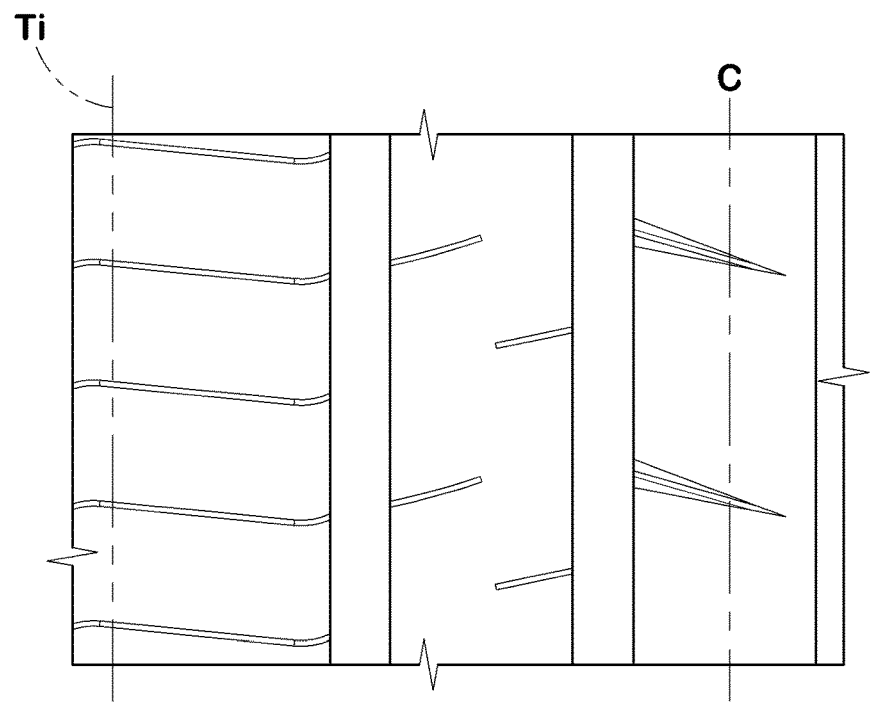
FIG. 21 is an enlarged view of a major part of a tread pattern of a tyre according to comparative example 4.

Further, tyres with the inboard middle land portions as shown in FIG. 20 and FIG. 21 were also tested. The inboard middle land portion of the tyre shown in FIG. 20 (Ref. 3) is provided with full-opened middle sipes, and the first middle sipes of the tyre shown in FIG. 21 (Ref 4) is not provided with any chamfer portions. Ref 3 and Ref. 4 have the same pattern as in Example 1 except for the configuration of the inboard middle land portion. In addition, the width of the main portions of the sipes was 0.8 mm for each tyre. The main common specifications of the examples are the same as described above except the following dimensions.

Opening width 12W2: 1.8 to 3.8 mm
Chamfer width 12W1: 0.5 to 1.5 mm

As to ride comfort, the same test as described above was conducted. The test results are shown in Table 2 with Ref. 3 as 100, and the larger the value, the better.

As to quietness, a 2500 cc FR passenger car with test tyres mounted on four wheels was run on a test course (ISO road surface) at a speed of 80 km/h with the engine off. Then, the maximum level dB(A) of passing noise was measured by a microphone installed at a position 7.5 m away from the center line of travel and at a height 1.2 m from the road surface. The results are shown in Table 2 with a score of Ref. 3 as 100. The larger the value, the better the quietness. Further, the tyres were mounted on a rim 18×7.5 J with an inner pressure of 220 kPa.

Table 2 shows the test result.

TABLE 2

|  | Ref. 3 | Ref. 4 | Ex. 1 | Ex. 2 |
|---|---|---|---|---|
| Tread pattern | FIG. 20 | FIG. 21 | FIG. 1 | FIG. 1 |
| Chamfer width 8W1 of crown sipes (mm) | 0 to 1.5 (increasing) | 0 to 1.5 (increasing) | 0 to 1.5 (increasing) | 1.0 (constant) |
| Chamfer depth 8D1 of crown sipes (mm) | 0 to 1.8 (increasing) | 0 to 1.8 (increasing) | 0 to 1.8 (increasing) | 1.0 (constant) |

TABLE 2-continued

|  | Ref. 3 | Ref. 4 | Ex. 1 | Ex. 2 |
|---|---|---|---|---|
| Chamfer width 9W1 of first inboard middle sipes (mm) | no chamfer | no chamfer | 0 to 1.0 (increasing) | 1.0 (constant) |
| Chamfer depth 9D1 of first inboard middle sipes (mm) | no chamfer | no chamfer | 0 to 1.6 (increasing) | 1.0 (constant) |
| Ride comfort (score) | 100 | 99 | 105 | 104 |
| Quietness (score) | 100 | 101 | 103 | 102 |

As a result of the test, it was confirmed that the tyres of Examples 1 and 2 improve ride comfort and quietness.

What is claimed is:

1. A tyre comprising:
a tread portion having a designated mounting direction to a vehicle, the tread portion being provided with a crown land portion, an outboard middle land portion and an outboard shoulder land portion which are located outboard of a vehicle when the tyre is mounted to the vehicle, an outboard crown circumferential groove extending between the crown land portion and the outboard middle land portion, an outboard shoulder circumferential groove extending between the outboard middle land portion and the outboard shoulder land portion, an inboard middle land portion and an inboard shoulder land portion which are located inboard of the vehicle when the tyre is mounted to the vehicle, an inboard crown circumferential groove extending between the crown land portion and the inboard middle land portion, and an inboard shoulder circumferential groove extending between the inboard middle land portion and the inboard shoulder land portion, wherein
the outboard middle land portion is provided with two or more full-opened outboard middle sipes,
the outboard middle sipes are inclined with respect to a tyre axial direction,
the outboard middle sipes each have two opposite sipe-edge portions provided with chamfer portions,
in each chamfer portion of each outboard middle sipe, chamfer widths at both ends in a sipe longitudinal direction of the outboard middle sipe are larger than a chamfer width of a central portion in the sipe longitudinal direction of the outboard middle sipe,
the outboard shoulder land portion is provided with two or more outboard shoulder sipes,
the outboard shoulder sipes are inclined in a same direction as the outboard middle sipes with respect to the tyre axial direction,
the crown land portion is provided with two or more semi-opened crown sipes,
the crown sipes each have two opposite sipe-edge portions provided with chamfer portions,
the inboard middle land portion is provided with two or more semi-opened first inboard middle sipes communicated with the inboard crown circumferential groove, and two or more semi-opened second inboard middle sipes communicated with the inboard shoulder circumferential groove,
the first inboard middle sipes each have two opposite sipe-edge portions provided with chamfer portions, and
the second inboard middle sipes each have two opposite sipe-edge portions where no chamfer portion is provided.

2. The tyre according to claim 1, wherein
each chamfer portion of each outboard middle sipe increases in chamfer width from the central portion to the both ends continuously, and
in each outboard middle sipe,
chamfer depths at the both ends of the outboard middle sipe are greater than a chamfer depth of the central portion of the outboard middle sipe, and
a depth of the outboard middle sipe at an innermost end thereof in the tyre axial direction is greater than a depth of the outboard middle sipe at an outermost end thereof in the tyre axial direction.

3. The tyre according to claim 2, wherein in each outboard middle sipe, the depth of the outboard middle sipe at the innermost end is in a range from 65% to 85% a maximum depth of the outboard crown circumferential groove, and the depth of the middle sipe at the outermost end is in a range from 45% to 65% the maximum depth of the outboard crown circumferential groove.

4. The tyre according to claim 2, wherein
the first inboard middle sipes are arranged so as not to overlap the crown sipes in the tyre circumferential direction, and
the second inboard middle sipes are arranged so as to overlap the crown sipes in the tyre circumferential direction.

5. The tyre according to claim 4, wherein
the first inboard middle sipes and the second inboard middle sipes are inclined with respect to the tyre axial direction, and
the crown sipes, with respect to the tyre axial direction, are inclined in an opposite direction to the first inboard middle sipes and the second inboard middle sipes.

6. The tyre according to claim 5, wherein
in each chamfer portion of each crown sipe, a chamfer width increases toward the inboard crown circumferential groove, and
in each chamfer portion of each first inboard middle sipe, a chamfer width increases toward the inboard crown circumferential groove.

7. The tyre according to claim 1, wherein the outboard shoulder sipes comprise one or more full-opened first outboard shoulder sipes each of which is arranged so as to be contiguous to a respective one of the outboard middle sipes smoothly via the shoulder circumferential groove.

8. The tyre according to claim 7, wherein the outboard shoulder sipes comprises one or more semi-opened second outboard shoulder sipes each of which is arranged so as not to be contiguous to the outboard middle sipes smoothly via the shoulder circumferential groove.

9. The tyre according to claim 1, wherein
the first inboard middle sipes are arranged so as not to overlap the crown sipes in the tyre circumferential direction, and
the second inboard middle sipes are arranged so as to overlap the crown sipes in the tyre circumferential direction.

10. The tyre according to claim 9, wherein
the first inboard middle sipes and the second inboard middle sipes are inclined with respect to the tyre axial direction, and
the crown sipes, with respect to the tyre axial direction, are inclined in an opposite direction to the first inboard middle sipes and the second inboard middle sipes.

11. The tyre according to claim 10, wherein
in each chamfer portion of each crown sipe, a chamfer width increases toward the inboard crown circumferential groove, and
in each chamfer portion of each first inboard middle sipe, a chamfer width increases toward the inboard crown circumferential groove.

12. The tyre according to claim 1, wherein
the inboard shoulder land portion is provided with two or more full-opened inboard shoulder sipes, and
some of the inboard shoulder sipes are arranged so as to be contiguous to the second inboard middle sipes smoothly via the inboard shoulder circumferential groove.

13. The tyre according to claim 12, wherein the inboard shoulder sipes each have two opposite sipe-edge portions where no chamfer portion is provided.

14. The tyre according to claim 13, wherein a total number of the inboard shoulder sipes is greater than a total number of the second inboard middle sipes.

15. The tyre according to claim 14, wherein the inboard shoulder land portion has no grooves other than sipes.

16. A tyre comprising:
a tread portion being provided with a middle land portion, a shoulder land portion, and a shoulder circumferential groove extending between the middle land portion and the shoulder land portion, wherein
the middle land portion is provided with two or more full-opened middle sipes,
the middle sipes are inclined with respect to a tyre axial direction,
the middle sipes each have two opposite sipe-edge portions provided with chamfer portions,
in each chamfer portion of each middle sipe, chamfer widths at both ends in a sipe longitudinal direction of the middle sipe are larger than a chamfer width of a central portion in the sipe longitudinal direction of the middle sipe,
each chamfer portion of each middle sipe increases in chamfer width from the central portion to the both ends continuously,
in each middle sipe, chamfer depths at the both ends of the middle sipe are greater than a chamfer depth of the central portion of the middle sipe, and a depth of the middle sipe at an innermost end thereof in the tyre axial direction is greater than a depth of the middle sipe at an outermost end thereof in the tyre axial direction,
the shoulder land portion is provided with two or more shoulder sipes that are inclined in a same direction as the middle sipes with respect to the tyre axial direction,
the shoulder sipes comprise a plurality of full-opened first shoulder sipes and a plurality of semi-opened second shoulder sipes, and
the first shoulder sipes and the second shoulder sipes are not provided with any chamfer portions.

17. The tyre according to claim 16, wherein
a crown circumferential groove is arranged adjacently inwardly of the middle land portion in the tyre axial direction, and
in each middle sipe, the depth of the middle sipe at the innermost end is in a range from 65% to 85% a maximum depth of the crown circumferential groove, and the depth of the middle sipe at the outermost end is in a range from 45% to 65% the maximum depth of the crown circumferential groove.

18. A tyre comprising:
a tread portion being provided with a crown land portion, a middle land portion, a shoulder land portion, a crown circumferential groove extending between the crown land portion and the middle land portion, and a shoulder circumferential groove extending between the middle land portion and the shoulder land portion, wherein
the crown land portion is provided with two or more semi-opened crown sipes,
the crown sipes each have two opposite sipe-edge portions provided with chamfer portions,
the middle land portion is provided with two or more semi-opened first middle sipes communicated with the crown circumferential groove, and two or more semi-opened second middle sipes communicated with the shoulder circumferential groove, and
the first middle sipes each have two opposite sipe-edge portions provided with chamfer portions,
the first middle sipes are arranged so as not to overlap the crown sipes in a tyre circumferential direction,
the second middle sipes each have two opposite sipe-edge portions where no chamfer portion is provided,
the second middle sipes are arranged so as to overlap the crown sipes in the tyre circumferential direction,
the first middle sipes and the second middle sipes are inclined with respect to a tyre axial direction, and
the crown sipes, with respect to the tyre axial direction, are inclined in an opposite direction to the first middle sipes and the second middle sipes.

19. The tyre according to claim 18, wherein
in each chamfer portion of each crown sipe, a chamfer width increases toward the crown circumferential groove, and
in each chamfer portion of each first middle sipe, a chamfer width increases toward the crown circumferential groove.

\* \* \* \* \*